(12) United States Patent
Klemes

(10) Patent No.: US 10,715,243 B2
(45) Date of Patent: *Jul. 14, 2020

(54) PSEUDO-DOPPLER RECEIVING ARCHITECTURE FOR OAM AND MIMO TRANSMISSIONS

(71) Applicant: HUAWEI TECHNOLOGIES CO., LTD., Shenzhen, Guangdong (CN)

(72) Inventor: Marek Klemes, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/655,115

(22) Filed: Oct. 16, 2019

(65) Prior Publication Data

US 2020/0127729 A1    Apr. 23, 2020

Related U.S. Application Data

(63) Continuation-in-part of application No. 16/294,513, filed on Mar. 6, 2019.
(Continued)

(51) Int. Cl.
*H04B 7/08* (2006.01)
*H04B 7/0413* (2017.01)
(Continued)

(52) U.S. Cl.
CPC ......... *H04B 7/0868* (2013.01); *H04B 7/0413* (2013.01); *H04B 7/0606* (2013.01); *H04B 7/0817* (2013.01); *H04L 27/2665* (2013.01)

(58) Field of Classification Search
CPC .. H04B 7/0413; H04B 7/0868; H04B 7/0606; H04B 7/0817; H04L 25/03343;
(Continued)

(56) References Cited

U.S. PATENT DOCUMENTS

| 4,931,977 A | 6/1990 | Klemes |
| 9,768,503 B2 | 9/2017 | Klemes |

(Continued)

FOREIGN PATENT DOCUMENTS

| CN | 105827287 A | 8/2016 |
| CN | 107888534 A | 4/2018 |

OTHER PUBLICATIONS

Sheleg, "A Matrix-Fed Circular Array for Continuous scanning", Proceedings of the IEEE, vol. 56, No. 11, Nov. 1968.
(Continued)

*Primary Examiner* — Kabir A Timory
(74) *Attorney, Agent, or Firm* — BCF LLP

(57) ABSTRACT

The disclosed systems, structures, and methods are directed to a multiple-input multiple-output (MIMO) receiver. The MIMO receiver includes at least two receiver antenna elements to receive radiated MIMO signal beams containing superposed order modes and to generate antenna element output signals based on the received MIMO signal beams. The receiver antenna elements are spatially separated by a distance. A variable ratio combining unit operates to switch between the antenna output signals based on a high-rate periodic waveform that emulates unidirectional movement by the antenna elements to produce a pseudo-Doppler frequency shift. The variable ratio combining unit further modulates the antenna output signals based on the periodic waveform to impart a fractional pseudo-Doppler shift to each MIMO mode and combines the modulated antenna element output signals in accordance with the fractional pseudo-Doppler shift to facilitate separation of the MIMO modes.

28 Claims, 23 Drawing Sheets

Related U.S. Application Data

(60) Provisional application No. 62/748,226, filed on Oct. 19, 2018.

(51) Int. Cl.
*H04L 27/26* (2006.01)
*H04B 7/06* (2006.01)

(58) Field of Classification Search
CPC ...... H04L 27/2665; H01P 5/222; H01P 5/227; H04J 14/04
See application file for complete search history.

(56) References Cited

U.S. PATENT DOCUMENTS

| | | | |
|---|---|---|---|
| 2008/0170533 A1 | 7/2008 | Cyzs et al. | |
| 2015/0349910 A1* | 12/2015 | Huang | H04J 14/00 398/44 |
| 2017/0366270 A1 | 12/2017 | Ashrafi | |
| 2018/0270791 A1 | 9/2018 | Park et al. | |

OTHER PUBLICATIONS

Davies, "Electronic steering of multiple nulls for circular arrays", Electronics Letters, pp. 669-670, vol. 13, No. 22, Oct. 27, 1977.
Rahim et al., "Effect of directional elements on the directional response of circular antenna arrays", IEE Proceedings, vol. 129, Pt. H, No. 1, Feb. 1982.
Davis, "Phase Mode Excitation in Beamforming Arrays", Proceedings of the 3rd European Radar Conference, Manchester, UK, Sep. 2006.
Trichili et al., "Communicating Using Spatial Mode Multiplexing: Potentials, Challenges and Perspectives", preprint, arXiv:1808.02462v2 [cs.IT] Aug. 8, 2018.
Edfors et al., "Is Orbital Angular Momentum (OAM) Based Radio Communication an Unexploited Area?", IEEE Transactions on Antennas and Propagation, vol. 60, No. 2, Feb. 2012.
Cagliero et al., "A New Approach to the Link Budget Concept for an OAM Communication Link", IEEE Antennas and Propagation Letters, vol. 15, 2016.
Zhao et al., "A Dual-Channel 60 GHz Communications Link Using Patch Antenna Arrays to Generate Data-Carrying Drbital-Angular-Momentum Beams", IEEE Wireless Communications Symposium proceedings, IEEE ICC 2016.
Laakso et al., "Splitting the Unit Delay", IEEE Signal Processing Magazine, pp. 30-60, Jan. 1996.
Meng et al., "Phase-modulation based transmitarray convergence lens for vortex carrying orbital angular momentum", Optics Express 22019, vol. 26, No. 17, Aug. 20, 2018.
Palacin et al., "An 8×8 Butler Matrix for Generation of Waves Carrying Orbital Angular Momentum (OAM)", The 8th European Conference on Antennas and Propagation (EuCAP 2014), 2014, pp. 2814-2818.
Rundstedt et al., "On Field Measurements and Modelling of 2×2 Microwave LOS-MIMO Systems", 2015 IEEE Global Communications Conference (Globecom), 2015.
Padgett, "Orbital angular momentum 25 years on [Invited]", Optics Express 11265, vol. 25, No. 10, May 2017.
Zhang et al., "Millimetre wave with rotational orbital angular momentum", Scientific Reports, vol. 6, Article No. 31921, 2016.
Zhang et al., "Detecting the orbital angular momentum of electromagnetic waves using virtual rotational antenna", Scientific Reports, vol. 7, Article No. 4585, 2017.
Tennant et al., "Generation of OAM radio waves using circular time-switched array antenna", Electronics Letters vol. 48 No. 21, Oct. 11, 2012.
Allen et al., "Wireless data encoding and decoding using OAM modes", Electronics Letters vol. 50 No. 3 pp. 232-233, Jan. 30, 2014.
Nano et al., "Multiple-antenna phase-gradient detection for OAM radio communications", Electronics Letters vol. 51 No. 9 pp. 724-725, Apr. 30, 2015.
Chen et al., "High-sensitivity OAM phase gradient detection based on time-modulated harmonic characteristic analysis", Electronics Letters vol. 53, No. 12, pp. 812-814, Jun. 8, 2017.
Drysdale et al., "Discretely-Sampled Partial Aperture Receiver for Orbital Angular Momentum Modes", Antennas and Propagation & USNC/URSI National Radio Science Meeting 2017 IEEE International Symposium on, pp. 1431-1432, 2017.
Hu et al., "Simulation of orbital angular momentum radio communication systems based on partial aperture sampling receiving scheme", Institution of Engineering and Technology (IET) journals, IET Microwaves, Antennas & ropagation, vol. 10, Issue 10, pp. 1043-1047, 2016.
Drysdale et al., "Sinusoidal Time-Modulated Uniform Circular Array for Generating Orbital Angular Momentum Modes", IEEE 11th European Conference on Antennas and Propagation (EUCAP) 2017.
Lee et al., "An Experimental Demonstration of 28 GHz Band Wireless OAM-MIMO (Orbital Angular Momentum Multi-input and Multi-Output) Multiplexing", IEEE 87-th Vehicular Technology Conference (VTC Spring) 2018.
Larsson, "Lattice Array Receiver and Sender for Spatially OrthoNormal Mimo Communication", Ericsson Research, 2005 IEEE.
NTT Group, NTT successfully demonstrates 100 Gbps wireless transmission using a new principle (OAM multiplexing) as a world's first, May 15, 2018, retrieved from http://www.ntt.co.jp/news2018/1805e/180515a.html on Jun. 12, 2019.
Long Li et al. MIMO Equalization to Mitigate Turbulence in a 2-Channel 40-Gbit/s QPSK Free-Space Optical 100-m sound-trip OrbitalAngular-Momentum-Multiplexed Link between a Ground Station and a Retro-Reflecting UAV, Published in: 2018 European Conference on Optical Communication (ECOC), total 3 pages.
Baiyang Liu et al. A Broadband Dual-Polarized Dual-OAM-Mode Antenna Array for OAM Communication, IEEE Antennas and Wireless Propagation Letters, Vol. 16, 2017, pp. 744-747.
Andong Wang et al. Experimental Demonstration of Dense Fractional Orbital Angular Momentum (OAM) Multiplexing with a Channel Spacing of 0.2 Assisted by MIMO Equalization, Asia Communications and Photonics Conferene (ACP) OSA 2016, pp. 1-3.
NTT Docomo:"RAN WG's progress on NR WI in the August and September meetings 2017", 3GPP TSG-RAN WG2 #99bis R2-1710077, Oct. 9-13, 2017Prague, Czech Republic, total 120 pages.

\* cited by examiner

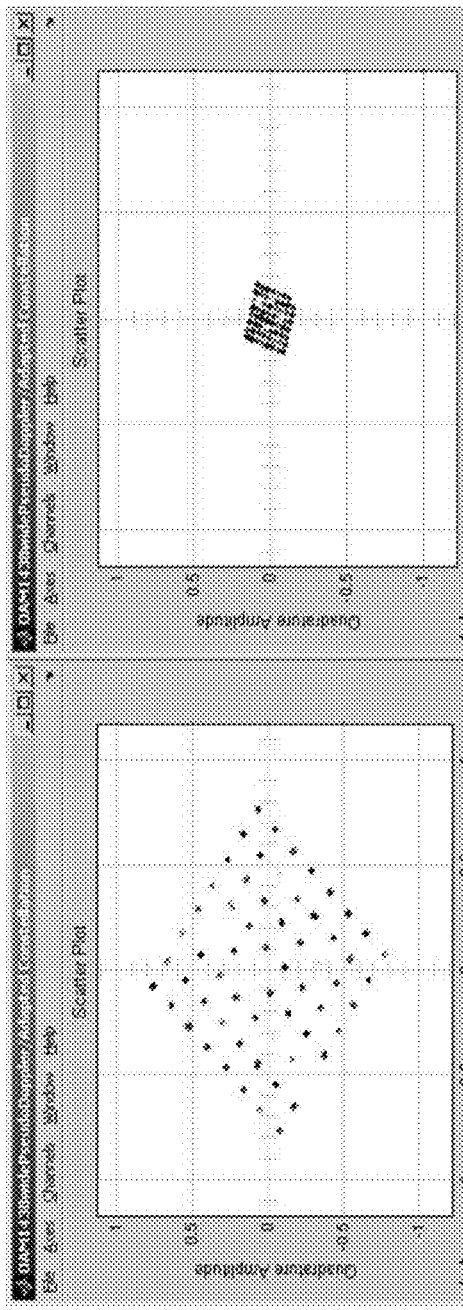
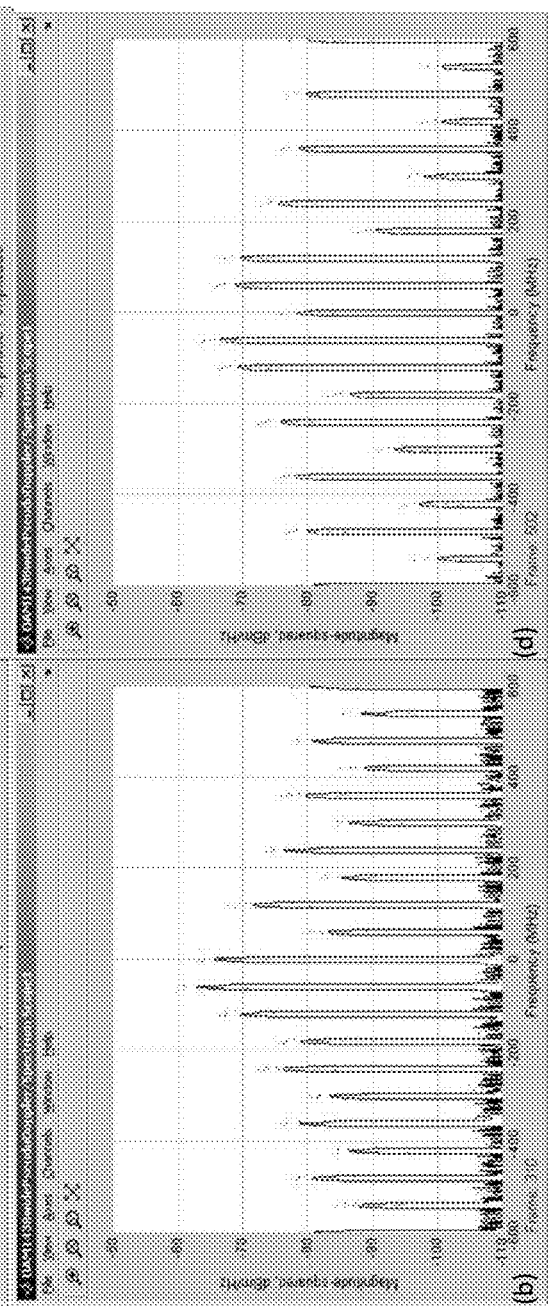
FIG. 4A  FIG. 4B  FIG. 4C  FIG. 4D

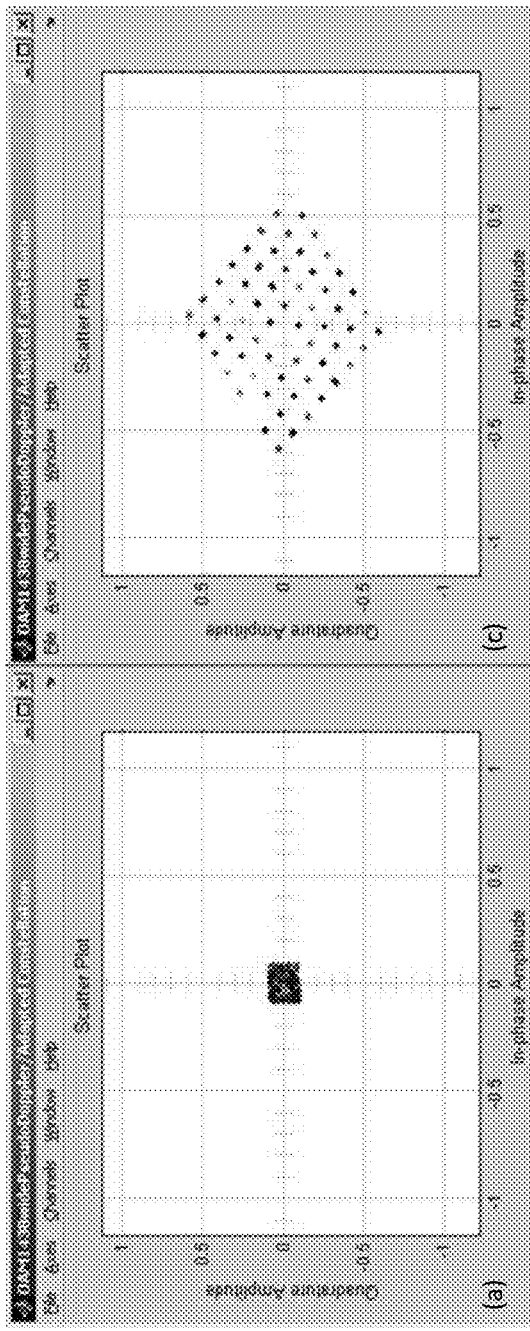
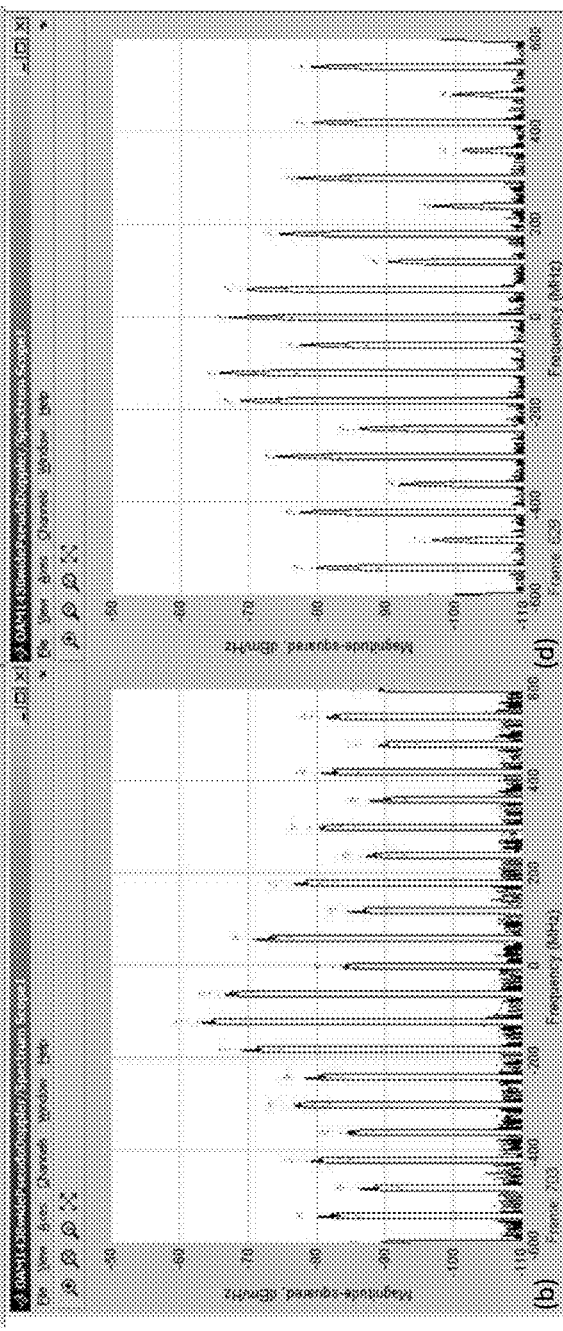
FIG. 5A  FIG. 5C
FIG. 5B  FIG. 5D

PSEUDO-DOPPLER RECEIVING ARCHITECTURE FOR OAM AND MIMO TRANSMISSIONS

CROSS-REFERENCE TO RELATED APPLICATIONS

This application is a continuation-in-part of U.S. patent application Ser. No. 16/294,513, filed on Mar. 6, 2019 and entitled "OAM Pseudo-Doppler Receiving Architecture", which claims the benefit of priority to US Provisional Patent Application Ser. No. 62/748,226, filed on Oct. 19, 2018 and entitled "OAM Pseudo-Doppler Receiving Architecture", the contents of both of which are incorporated herein by reference.

FIELD OF THE INVENTION

The present invention generally relates to the field of radio-frequency (RF) communications, in particular, to systems and methods directed to applying pseudo-Doppler techniques to substantially enhance the processing fidelity and accuracy of received orbital angular momentum (OAM)-based RF communication links. In other embodiments, the systems and method can be used to apply pseudo-Doppler techniques to aid in the processing of Multiple-Input-Multiple-Output (MIMO) based RF transmissions.

BACKGROUND

In view of the proliferation of wireless communication usage, numerous proposals have been presented regarding the improvement of service facilities for existing wireless communication systems as well as for next-generation wireless communication systems. Many of the proposed improvements call for the enhanced capabilities and increased implementation of multiple-input, multiple-output (MIMO) and massive-MIMO (M-MIMO) receiver architectures.

To this end, orbital angular momentum (OAM)-based radio-frequency (RF) signals offer an additional spatial dimension, namely, an additional degree of freedom, which can be exploited to enhance the capacity of wireless communication links.

However, conventional implementations of OAM-based RF communications have demonstrated certain deficiencies regarding the effective recovery of OAM signals at far-field distances.

SUMMARY

An object of the present disclosure is to provide an orbital angular momentum (OAM) receiver architecture and system. The disclosed system includes at least two receiver antenna elements configured to receive radiated OAM signal beams containing superposed k order modes and to generate antenna element output signals based on the received OAM signal beams, in which the receiver antenna elements are positioned tangentially along a circular locus and spatially separated by a distance d. A variable ratio combining unit combines the antenna element output signals in time-varying proportions. The variable ratio combining unit is configured to switch between portions of the antenna element output signals based on a high-rate periodic waveform of frequency F, the high-rate switching operation emulating unidirectional movement by the antenna elements to produce a pseudo-Doppler frequency shift. The variable ratio combining unit further modulates and time-gates the antenna element output signals based on the high frequency periodic waveform to impart a fractional pseudo-Doppler shift to each OAM mode and combines the modulated and time-gated antenna element output signals in accordance with the fractional pseudo-Doppler shift to facilitate separation of the OAM modes encompassing the streams of information data symbols.

A further object of the present disclosure is to provide a method for processing received orbital angular momentum (OAM) signals. The disclosed method includes receiving, by at least two receiver antenna elements, radiated OAM signal beams containing superposed k order modes wherein each of the K modes encompasses an individual stream of information data symbols, in which the receiver antenna elements are positioned tangentially along a circular locus and spatially separated by a distance d and a circular locus with a radius R corresponding to a footprint area of the received OAM signal beams, such that the circular locus contains progressive phase gradient information along a circumference of the circular locus. Antenna element output signals are generated based on the received OAM signal beams and are combined by a variable ratio combining unit in time-varying proportions. Portions of the antenna element output signals are switched in accordance with a high-rate periodic waveform of frequency F, the high-rate switching operation providing emulation of unidirectional movement by the receiver antenna elements along the circumference of the circular locus to produce a pseudo-Doppler frequency shift. The antenna element output signals are modulated and time-gated in accordance with the high frequency periodic waveform to impart a different pseudo-Doppler shift to each OAM mode. The modulated and time-gated antenna element output signals are then combined in accordance with the fractional pseudo-Doppler shift to facilitate separation of the OAM modes encompassing the streams of information data symbols.

A further object of the present disclosure is to provide a multiple-input multiple-output (MIMO) receiver system, comprising: at least two receiver antenna elements configured to receive radiated MIMO signal beams and generate antenna element output signals based on the received MIMO signal beams, the receiver antenna elements spatially separated by a distance $d_R$; the radiated MIMO signal beams containing superposed n order modes, wherein each of N modes encompasses an individual stream of information data symbols; a variable ratio combining unit operative to receive and combine the antenna element output signals in time-varying proportions, the variable ratio combining unit configured to: switch between portions of the antenna element output signals in accordance with a high-rate periodic waveform of frequency F, the high-rate switching operation providing emulation of unidirectional movement by a virtual receiver antenna element along a locus that intersects the phase-fronts of the MIMO beams, to produce a pseudo-Doppler frequency shift; modulate and time-gate the antenna element output signals in accordance with the high frequency periodic waveform to impart a fractional pseudo-Doppler shift to each MIMO mode; and combine the modulated and time-gated antenna element output signals in accordance with the fractional pseudo-Doppler shift to facilitate separation of MIMO modes encompassing the streams of information data symbols.

A further object of the present disclosure is to provide a method for processing multiple-input multiple-output (MIMO) signals, comprising: receiving, by at least two receiver antenna elements, radiated MIMO signal beams containing superposed n order modes wherein each of N modes encompasses an individual stream of information data symbols, the receiver antenna elements being spatially separated by a distance $d_R$; generating, by the receiver antenna elements, antenna element output signals based on the received MIMO signal beams; combining, by a variable ratio combining unit, the antenna element output signals in time-varying proportions; switching between portions of the antenna element output signals in accordance with a high-rate periodic waveform of frequency F, the high-rate switching operation providing emulation of unidirectional movement by the receiver antenna elements along a locus that intersects the phase-fronts of the MIMO beams to produce a pseudo-Doppler frequency shift; modulating and time-gating the antenna element output signals in accordance with the high frequency periodic waveform to impart a fractional pseudo-Doppler shift to each MIMO mode; and combining the modulated and time-gated antenna element output signals in accordance with the fractional pseudo-Doppler shift to facilitate separation of the MIMO modes encompassing the streams of information data symbols.

The frequency F of the high-rate periodic waveform may satisfy the relationship: $F > B\lambda L/(\pi d_T d_R)$, where B is the bandwidth of the received MIMO signals, $d_T$ is the distance between adjacent transmitter antennas, $\lambda$ is a radio frequency (RF) carrier wavelength, and L is a distance between the receiver antenna elements and a transmitter.

The variable ratio combining unit may comprise oppositely-adjusted variable phase shifting elements that are modulated by the high-rate periodic waveform.

The variable ratio combining unit may comprise multiplying elements that are modulated by the high-rate periodic waveform. The variable ratio combining unit may comprise a synchronous time-gating unit that is controlled by the high-rate periodic waveform. The variable ratio combining unit may comprise at least one hybrid coupling element. The modulated, time-gated antenna element output signals may be shifted by multiples of frequency F then low-pass filtered to generate baseband signals.

The baseband signals may be each multiplied by a weighting coefficient and then summed up to provide separate n-th MIMO mode baseband signals.

The MIMO receiver system may further comprise four antenna elements, two first-stage variable ratio combining units, and a final stage variable ratio combining unit wherein a separation of the antenna elements corresponding to the two first stage variable ratio combining units is $2d_R$. The two first-stage variable ratio combining units and the final stage variable ratio combining unit may be modulated synchronously with a same phase by the high-rate periodic waveform.

The method may further comprise shifting the modulated, time-gated antenna element output signals by multiples of frequency F and low-pass filtering the antenna element output signals to generate baseband signals. The method may further comprise multiplying the baseband signals by a weighting coefficient and summing up to provide separate n-th MIMO mode baseband signals.

The method may further comprise providing four antenna elements, two first-stage variable ratio combining units, and a final stage variable ratio combining unit wherein the separation of the antenna elements corresponding to the two first stage variable ratio combining units is $2d_R$. The method may further comprise modulating the two first-stage variable ratio combining units and the final stage variable ratio combining unit synchronously with a same phase by the high-rate periodic waveform.

The method may further comprise passing an output signal of the synchronous time-gating unit through a frequency-domain filter bank. The filter bank may further comprise a buffer block configured to: store $N_{FFT}$ samples of the output signal of the synchronous time-gating unit; generate a vector of the output signal of the synchronous time-gating unit. The method may further comprise: applying a time window to the vector to generate a time window output; and applying a Fast-Fourier-Transform (FFT) to the time window output at an FFT block.

The method may further comprise: shifting the spectral outputs of the FFT block by modulating an output signal of the FFT block with a periodic waveform and low-pass filtering the spectral outputs to generate baseband signals; and further multiplying the baseband signals by weighting coefficients and summing up to provide separate n-th MIMO mode baseband signals. The periodic waveform may be a complex-conjugate sinusoid having a frequency that is a corresponding multiple of twice the frequency F.

The method may further comprise generating adapted weighing coefficients by determining an error signal by subtracting the separate n-th MIMO mode baseband signals from a reference signal and multiplying the error signal by the spectral outputs of the FFT block.

BRIEF DESCRIPTION OF THE FIGURES

The features and advantages of the present disclosure will become apparent from the following detailed description, taken in combination with the appended drawings, in which:

FIG. 4A illustrates a received signal constellation plot for an OAM8 beam at a 0 Hz down-conversion frequency shift, in accordance with various embodiments of the present disclosure;

FIG. 4B illustrates spectral characteristics for the OAM8 beam at the 0 Hz down-conversion frequency shift, in accordance with various embodiments of the present disclosure;

FIG. 4C illustrates a received signal constellation plot for an OAM1 beam at the 0 Hz down-conversion frequency shift, in accordance with various embodiments of the present disclosure;

FIG. 4D illustrates spectral characteristics for the OAM1 beam at the 0 Hz down-conversion frequency shift, in accordance with various embodiments of the present disclosure;

FIG. 5A illustrates a received signal constellation plot for an OAM8 beam at a 2F down-conversion frequency shift, in accordance with various embodiments of the present disclosure;

FIG. 5B illustrates spectral characteristics for the OAM8 beam at the 2F down-conversion frequency shift, in accordance with various embodiments of the present disclosure;

FIG. 5C illustrates a received signal constellation plot for an OAM1 beam at the 2F down-conversion frequency shift, in accordance with various embodiments of the present disclosure;

FIG. 5D illustrates spectral characteristics for the OAM1 beam at the 2F down-conversion frequency shift, in accordance with various embodiments of the present disclosure;

Figure 1A:
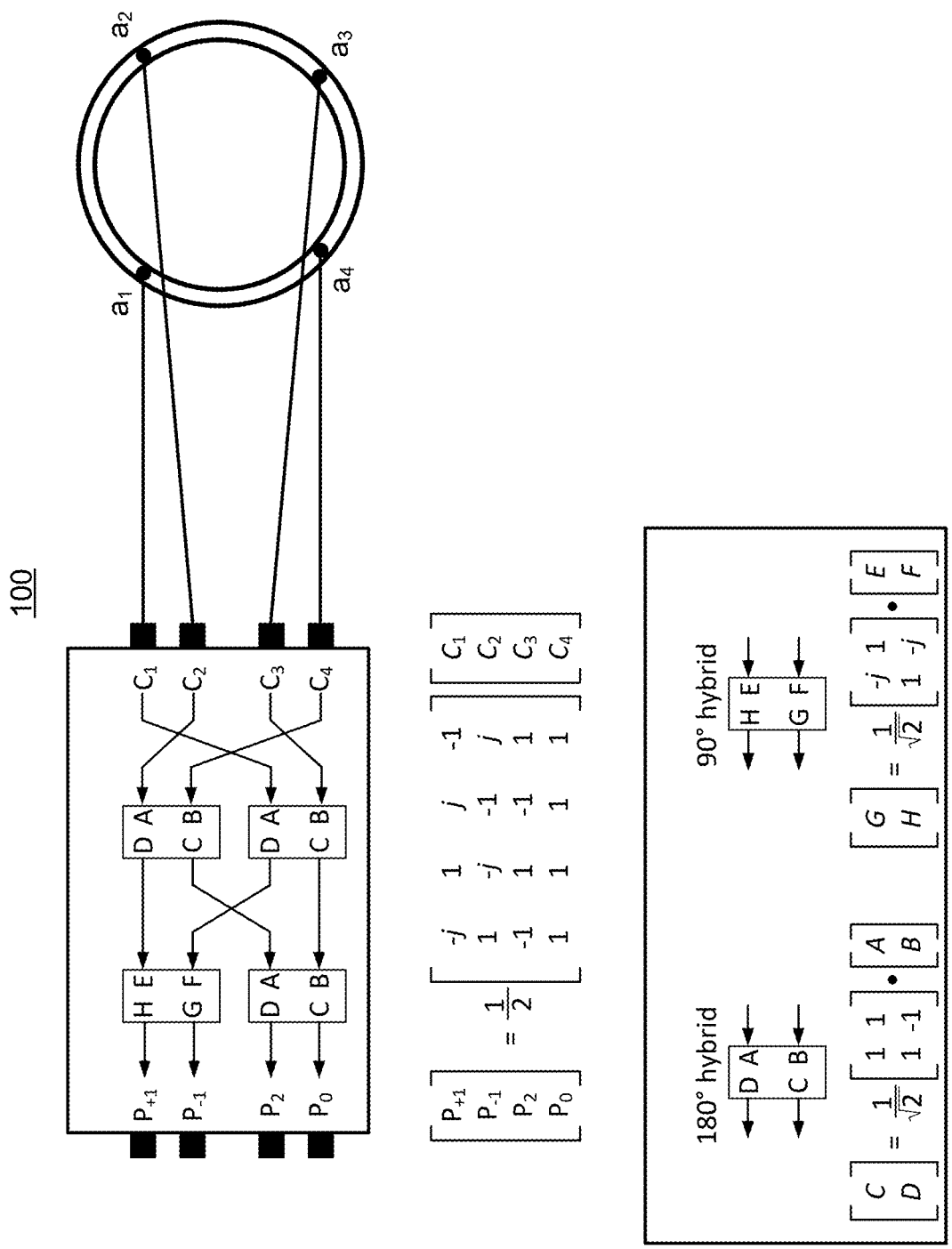
FIG. 1A (Prior Art) depicts a high-level functional block diagram of a conventional OAM RF generating architecture.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

As used herein, the term "about" or "approximately" refers to a +/−10% variation from the nominal value. It is to be understood that such a variation is always included in a given value provided herein, whether or not it is specifically referred to.

Unless otherwise defined, all technical and scientific terms used herein have the same meaning as commonly understood by one of ordinary skill in the art to which the described embodiments appertain.

It should be understood that OAM RF waves are configured to manifest various orders of OAM modes, denoted by integers ±k. The OAM RF waves are generated by imposing a phase shift of $k2\pi$ radians for every revolution of the observation point around the beam axis to produce a helical "corkscrew-shaped" waveform front. This may be achieved by using a uniform circular array of K identical antenna elements, wherein each of the K elements is fed by a current that is shifted in phase from that of its neighboring element in one direction by $k2\pi/K$ radians at the same amplitude.

As such, FIG. 1A (Prior Art) illustrates a high-level functional block diagram of a conventional OAM RF receiving architecture 100. As depicted, OAM architecture 100 comprises a circular array 110 of K antenna elements $a_1$-$a_K$ and a Butler Matrix structure 120 having K input ports $C_1$-$C_K$ and K output ports $P_1$-$P_K$. (For the sake of simplicity, K=4 in FIG. 1A). The architecture 100 operates in the receive mode to sense multiple OAM beam excitations along the circular array of K antenna elements. This is achieved by coupling the K antenna elements $a_1$-$a_K$ to the K input ports $C_1$-$C_K$ of the Butler Matrix structure and coupling the K output ports $P_1$-$P_K$ to the K receivers in the same RF band. Each of the K OAM beams is modulated by a different stream of independent data symbols, which are fed to a separate receiver. Being reciprocal, the same structure works in the transmitting mode, with the receivers replaced by transmitters, each of which is modulated by a different stream of independent data symbols.

Figure 1B:
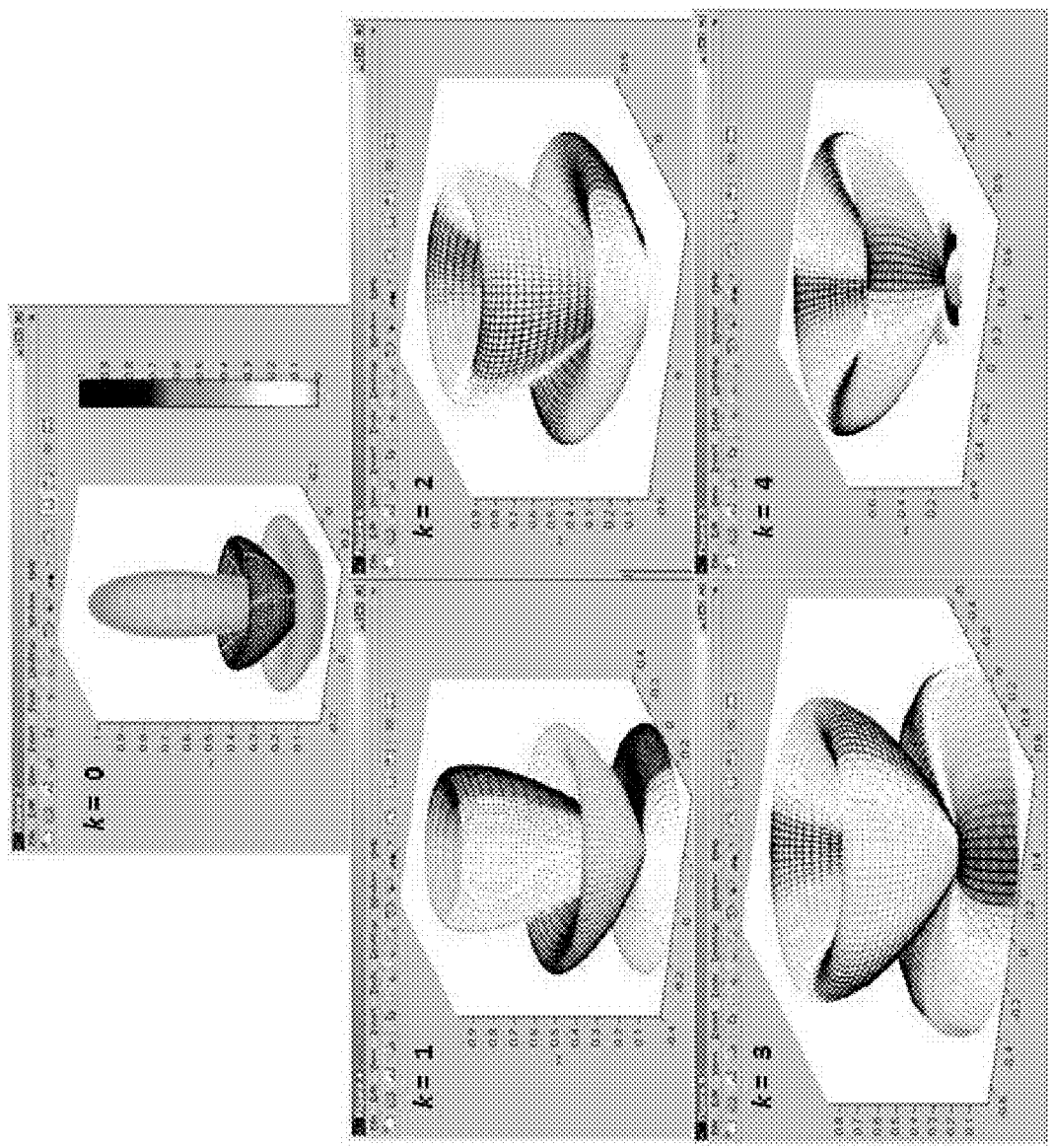
FIG. 1B (Prior Art) depicts a three dimensional graph of representative far-field OAM RF beam patterns.

FIG. 1B (Prior Art) depicts a three-dimensional graph of representative far-field OAM RF beam patterns 150. As shown, the OAM beam patterns exhibit a conical shape for all non-zero k orders having "vortex-shaped" axial nulls. The shade gradations indicate the electrical phase at a fixed time, modulo-$2\pi$ radians, in which the phase patterns rotate around the beam axis at the RF rate in time (i.e. one revolution per cycle at RF). In so doing the k phase fronts, as shown by the repeating shade gradations, pass a point on the cone of the k-th OAM beam along the tangential direction, per period of the RF carrier wave. Equivalently, at any given point in time, an electrical phase gradient of $k2\pi/(2\pi R)$ radians per meter exists along the circular locus of radius R around the axis of the conical beam of the k-th order OAM mode.

As noted above, the non-zero k order OAM beam patterns 150 manifest "vortex-shaped" axial nulls at far-field distances, which is typically where conventional receiving antennas/apparatus are positioned. Furthermore, the conventional receiver processing of OAM beams generally rely on spatial techniques employing the reciprocal principles used to generate the OAM modes at the transmitter.

As a result, most attempts at exploiting the OAM modes to enhance the capacity of radio links suffer from low signal-to-noise ratios (SNRs) and acute sensitivity to crosstalk issues due to position errors. Moreover, such attempts impose implementation restrictions on receiving antennas/apparatus, such as requiring the use of large receiving antennas, operational constraints associated with any or all of very short wavelengths and limited range distances.

OAM Psuedo-DOPPLER Receiver Scheme and System Architecture

The present disclosure provides an OAM RF receiver scheme and architecture that implements a pseudo-Doppler technique. The OAM pseudo-Doppler architecture refers receiver systems, devices, and other structures embodying the pseudo-Doppler technique. This technique provides a frequency domain-based solution to obviate or mitigate the above-noted limitations of conventional receiver schemes. As will be described in greater detail below, the disclosed embodiments provide for a pseudo-Doppler scheme that operates to enable toggling or gradual switching between signals outputted by at least two fixed, spatially-separated receiving antenna elements to artificially emulate a unidirectional antenna movement commensurate with traditional Doppler-based processing.

The emulated antenna movement is achieved by a rapid, periodic, modulating waveform controlling a variable ratio RF power combining (VRPC) unit that drives the toggling between the signals outputted by the antenna elements within defined time intervals. The VRPC unit subsequently combines the modulated antenna element signals and time-gates those signals for further processing designed to separate and demodulate the received OAM beams into meaningful payload data.

OAM Psuedo-DOPPLER Scheme

In traditional Doppler-based RF direction-finding applications, physically moving antennas are used to resolve angular direction based on detected frequency shifts of the received signal. By way of brief summary, such Doppler-based applications employ antenna element(s) that physically move (i.e., rotate) along a circular locus at a constant tangential velocity. The tangential velocity imparts a proportional Doppler frequency shift, which is imposed on the signal received at the antenna element(s) to frequency modulate (FM) the received signal. The FM signal manifests a deviation equivalent to the frequency shift and a phase corresponding to the azimuthal direction of the arriving received signal. The azimuthal angular direction is then resolved as a function of the FM phase information.

With this said, the disclosed embodiments present a scheme that exploits the principles noted above to artificially emulate the physical rotating motion of the antenna element(s) and create a pseudo-Doppler effect based on the phase gradient of an on-axis OAM beam. The pseudo-Doppler effect imparts a Doppler frequency shift that is proportional to the order k of each of the OAM modes of the received signals, thereby facilitating mode separation processing and subsequent extraction of payload data.

Figure 2A:
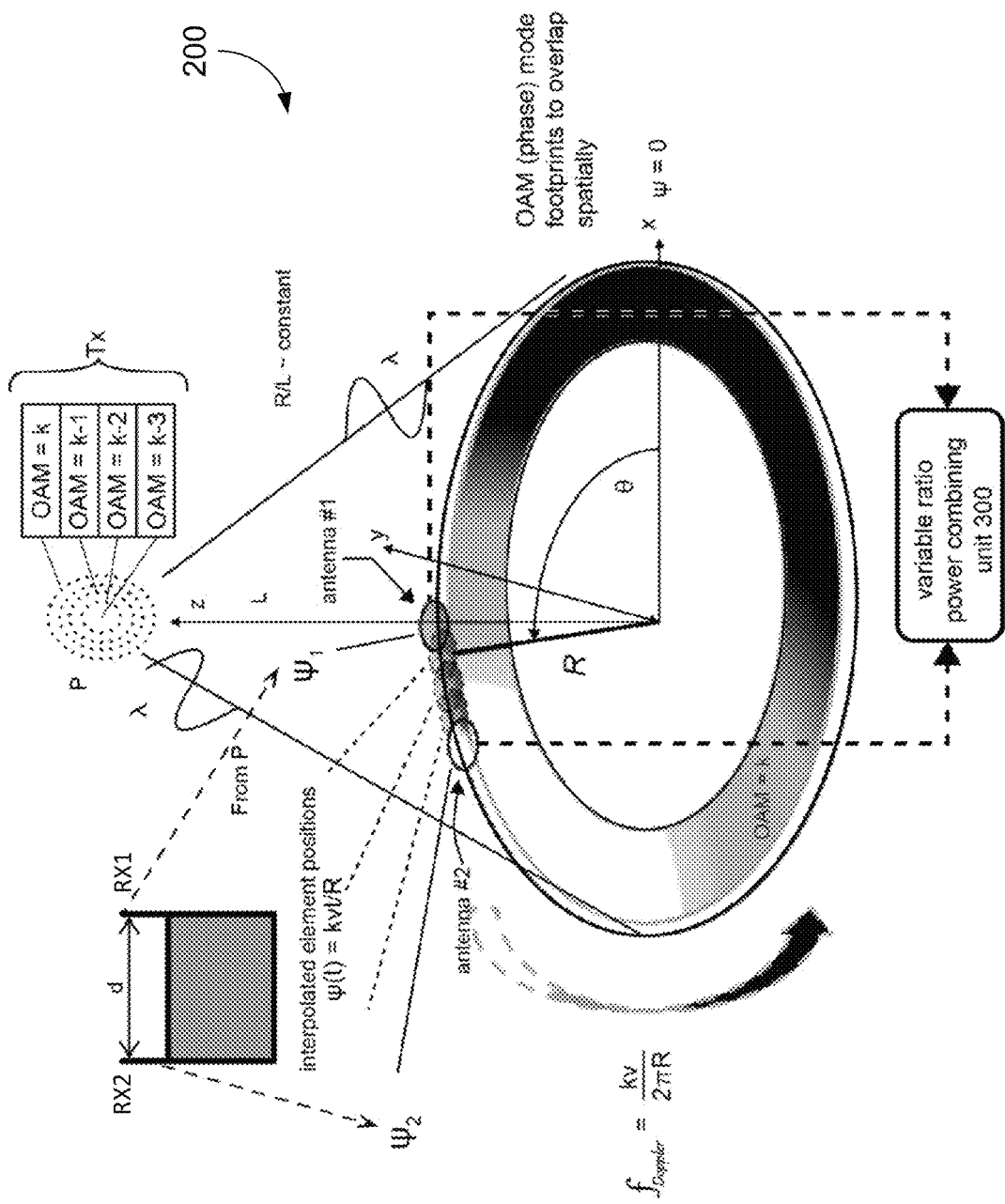
FIG. 2A illustrates a conceptual view of a pseudo-Doppler scheme, in accordance with various embodiments of the present disclosure.

In particular, FIG. 2A illustrates a conceptual view of pseudo-Doppler scheme 200, in accordance with various embodiments of the present disclosure. The depicted annular circular ring represents the footprint area of a k-th order OAM received conical beam, in which the shade gradations indicate spatial phase progression, or gradient, at a given time instant along the circular locus of the footprint annular ring defined by radius R. As shown, scheme 200 employs two receiver antenna elements RX1, RX2 that are fixedly positioned tangentially to the circular locus and are spatially separated by a distance d. With this arrangement, the physical movement of traveling along the circular locus may be artificially emulated by gradually switching between antenna elements RX1, RX2, in one direction, repeatedly.

That is, as shown in FIG. 2A, antenna elements RX1, RX2 are fixedly positioned along the circular locus separated by distance d. However, by rapidly and periodically toggling between portions of the signal outputted by elements RX1, RX2 over time, the appearance of unidirectional circumferential movement is achieved. The emulated circumferential movement is indicated by the interpolated element positions and the shaded arrow depicted in FIG. 2A. So, as the emulated movement appears to travel from one interpolated position to another, the corresponding changes in phase incurred by the emulated movement along the phase gradient produces a pseudo-Doppler frequency shift effect.

Figure 2B:
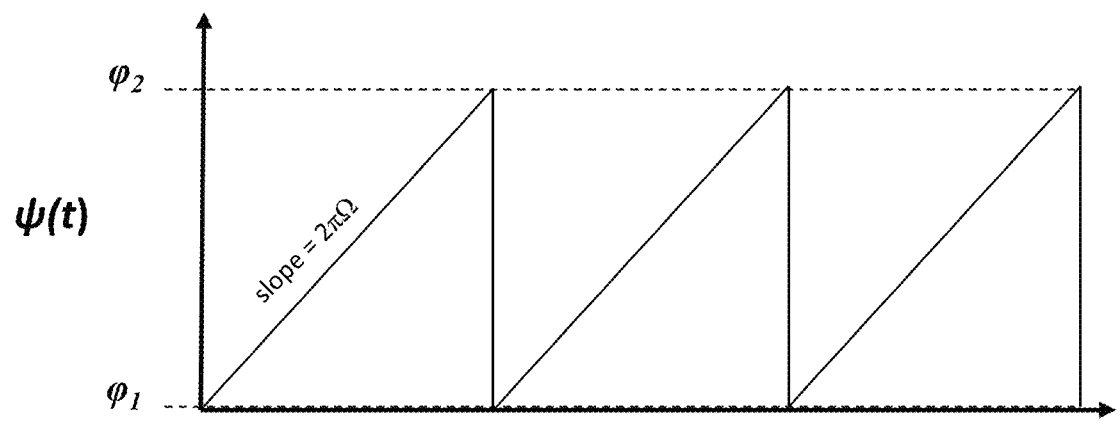
FIG. 2B depicts an interpolated phase between antenna element signals representative of the pseudo-Doppler effect.

FIG. 2B depicts a representative virtual antenna phase $\psi(t)$ effected by a control waveform P(t) configured to drive the rapid, periodic switching between the signals outputted by antenna elements RX1, RX2. As shown, control waveform P(t) manifests a "saw-tooth" or unidirectional profile that rapidly and periodically toggles between the elements RX1, RX2 signals having respective phases $\varphi_1$ and $\varphi_2$.

Figure 2C:
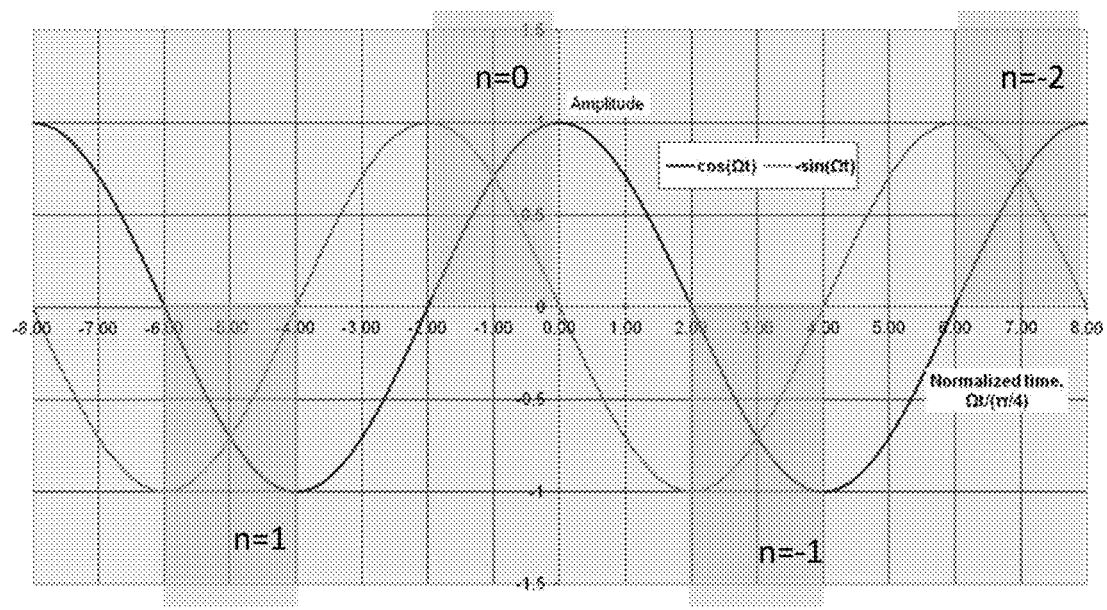
FIG. 2C depicts a representative control waveform configured to switch between receiving element signals.

It will be appreciated that the principles and concepts presented by the instant disclosure are not limited to the use of the control waveform P(t) noted above and implied by FIG. 2B, as other suitable waveforms capable of rapid, unidirectional, and periodic switching may be used. For example, FIG. 2C provides an alternative control waveform $P_s(t)$. $P_s(t)$ comprises orthogonal sinusoidal waveforms in which a sine modulation is applied to one antenna element output signal and a cosine modulation is applied to the other antenna element output signal, with suitable time-gating to emulate directionality in the final output signal, as in the embodiment depicted in FIG. 3B.

With regard to the time-gating functionality, it will be noted that the necessity of such functionality is a consequence of the limits of the region of validity relative to the pseudo-Doppler frequency shift when using the sine and cosine control waveforms where P(t)=$\Omega$t. The regional limits of validity are periodic, the fundamental period in terms of phase being:

$$\frac{-\pi}{2} < \Omega t < 0 \quad (1)$$

which repeats at intervals of $\pm n\pi$ as shown in FIG. 2C. Thus, the time-gating should occur periodically in real time to ensure the desired frequency shifts in the final output and should be synchronous with the pseudo-Doppler modulation.

It follows that the gating intervals are designed to contain those portions of the modulations which cause one antenna output to be increasing and the other decreasing the magnitude of its contribution to the final output signal. As shown in FIG. 2C, the alternating signs of the gating waveform ensure that always the same antenna output is increasing while the other is decreasing. In so doing, pseudo-Doppler scheme 200, performs the desired interpolation that emulates a unidirectionally moving antenna between the two stationary receive antennas.

OAM Pseudo-DOPPLER System Architecture

As depicted in FIG. 2A and noted in the description of pseudo-Doppler scheme 200, the signals outputted by antenna elements RX1, RX2 are supplied to a variable ratio power combining (VRPC) unit 300. VRPC unit 300 is configured to drive the switching between the signals outputted by elements RX1, RX2 to emulate unidirectional antenna movement based on a rapid, periodic, control waveform as well as combine the outputted signals. This emulated movement must be sufficiently rapid to effect a pseudo-Doppler shift that is at least as large as the bandwidth of each OAM mode modulation signal, so the OAM mode signals can be separated in frequency. This movement typically far exceeds any physically-realizable actual movement of the RX antenna elements.

In view of scheme 200 described above, it will be appreciated that the reference phase (relative to a fixed reference position on the footprint) for the emulated moving antenna element between RX1, RX2 may be expressed as:

$$\varphi = k\theta \quad (2)$$

where k is the OAM mode order and θ is the azimuthal angular position of the receiver element. It follows that, as antenna elements RX1, RX2 emulate movement of one antenna around the circular locus at a uniform velocity v, its emulated angular position changes linearly with time, thereby causing corresponding phase value changes in its output that also vary linearly with time. The time-based phase variances may be expressed as:

$$\frac{d\varphi}{dt} = \frac{kd\theta}{dt} = \frac{kv}{R} = 2\pi f_{Doppler} \quad (3)$$

$$\text{in which } v = \frac{d}{dt}(R\theta) \text{ and } 2\pi f_{Doppler} = \frac{kd\theta}{dt} \quad (4)$$

where R is the radius of the circular footprint locus. Thus, the spatial-domain properties of the OAM k-order beams include phase gradient information k/R which, by virtue of the emulated motion of antenna elements RX1, RX2, may be transformed to frequency-domain characteristics, namely, transverse Doppler shift $f_{Doppler}$. It will be noted that Doppler shift $f_{Doppler}$ is directly proportional to the received OAM mode k while remaining independent of the RF carrier frequency. It will be appreciated that the disclosed embodiments aim to replicate such a Doppler shift by replacing the role of the antenna velocity v with a toggling action between two separate but fixed antennas at a rate proportional to F, which is designated as the pseudo-Doppler frequency.

Given this context, the phases of the RF waves embodied by the OAM mode k beams received by antenna elements RX1, RX2 referenced as $\psi_1$, $\psi_2$ advance at k multiples of 2π radians for one complete cyclical trip around the circular footprint 2πR, at any given point in time. As such, the phases $\psi_1$, $\psi_2$ differ by kd/(2πR) for a portion of the footprint covered by the antenna element separation d. Therefore, the relationship between the respective phases $\psi_1$, $\psi_2$ of receiver antenna elements RX1, RX2 at time t may be expressed as:

$$\psi_2(t) = \psi_1(t) - k2\pi\left(\frac{d}{2\pi R}\right) \quad (5)$$

with the relationship between phases $\psi_1$, $\psi_2$, the inputs to VRPC unit 300, referenced as $W_1$, $W_2$, may be modeled, as follows:

$$W_{1,k}(t) = S_k(t)e^{j\psi_1(t)}$$

$$W_{2,k}(t) = S_k(t)e^{j\psi_2(t)} = S_k(t)e^{j\psi_1(t) - jkd/R} \quad (6)$$

where $S_k(t)$ is the signal of the k-th OAM beam received at the reference point in the far field. Furthermore, when P(t)=Ωt, Ω=2πF is the radian pseudo-Doppler frequency, F is the corresponding frequency in Hz, and the far-field condition kd/(2R)<<π/4 is met, one of the two outputs of VRPC unit 300, referenced as $Z_{1,k}(t)$, may be approximated at selected gating time intervals by:

$$z_{1,k}(t) \approx \sqrt{2}\, S_k(t)e^{j\left(\psi_1(t) - \frac{kd}{2R}\right)}(\cos(\Omega t + \pi/4))e^{j\left(\frac{kd}{2R}\right)(\Omega t + \pi/4)} \quad (7)$$

Figure 3A:
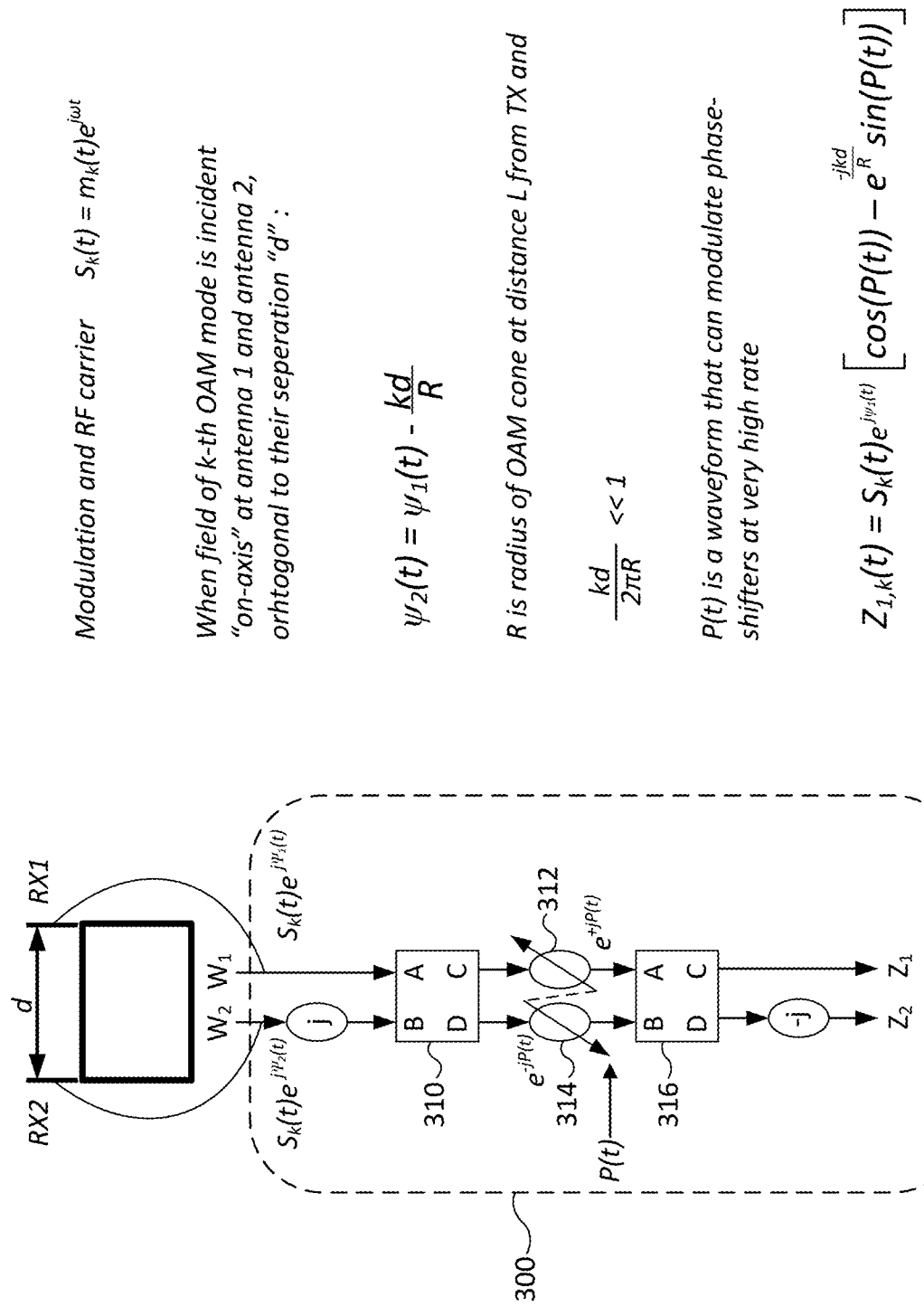
FIG. 3A depicts a high-level functional block diagram of a variable ratio power combining unit, in accordance with various embodiments of the present disclosure.

Armed with these relationships, the implementation of VRPC unit 300 may be realized. To this end, FIG. 3A illustrates a high-level functional block diagram of VRPC unit 300, in accordance with various embodiments of the present disclosure. In the illustrated embodiment, VRPC unit 300 incorporates two hybrid combiners 310, 316 and two oppositely-adjusted variable phase shifters 312, 314. The variable phase shifters 312, 314 are modulated by the control waveform P(t), as noted above, at a very high rate proportional to F. The output may then be expressed as:

$$Z_{1,k}(t) = S_k(t)e^{j\psi_1(t)}\left[\cos(P(t)) - e^{\frac{-jkd}{R}}\sin(P(t))\right] \quad (8)$$

where the k-th OAM mode signal may be modeled as the product of a data-modulation envelope and an RF carrier phasor:

$$S_k(t) = m_k(t)e^{j\omega t} \quad (9)$$

As shown in FIG. 3A, the outputs of receiving antenna elements RX1, RX2 are coupled to input ports $W_1$ and $W_2$ of VRPC unit 300, respectively, and the output is taken at port $Z_1$. It will be understood that at least one of port $Z_2$ and a switching arrangement between ports port $Z_1$, $Z_2$ to a common output port could also be used, consistent with the principles of the instant disclosure pertaining to subsequent time-gating arrangements to effect unidirectionality in the pseudo-Doppler frequency shifts.

The periodic waveform P(t) is applied to a control port and operates the variable phase-shifters in opposing directions at a high rate proportional to F. In so doing, the $Z_1$ and $Z_2$ output signals will appear to be shifted by a fraction of the pseudo-Doppler frequency, Fkd/(2R), which functionally corresponds to the originally desired transverse-Doppler shift, $f_{Doppler}$ as represented by equation (4).

In this manner, VRPC unit 300 is capable of combining the outputs of antenna elements RX1, RX2 in time-varying proportions ranging from only RX1 output, to half of each of the RX1, RX2 outputs, to only RX2 output. This is, in effect a form of gradual switching between the antenna elements in one direction that should be repeated periodically at some rate.

Figure 3B:
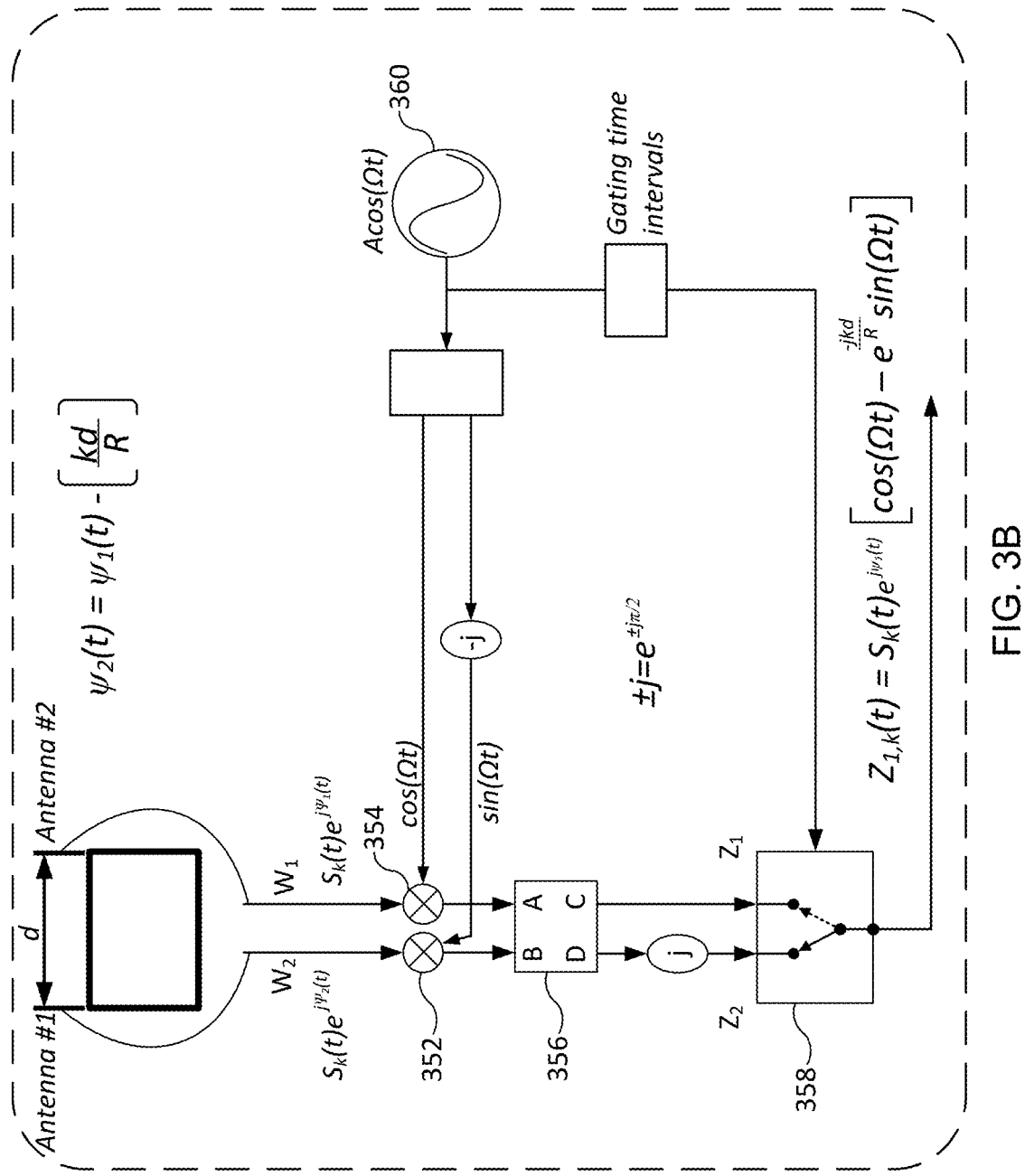
FIG. 3B depicts another variable ratio power combining unit that incorporates a gating unit at the output to emulate unidirectional antenna element motion, in accordance with various embodiments of the present disclosure.

FIG. 3B illustrates a high-level functional block diagram of an alternative VRPC unit 350, in accordance with various embodiments of the present disclosure. In the illustrated embodiment, VRPC unit 350 comprises two multipliers 352, 354, a hybrid combiner 356, and a switching and time-gating unit 358, 360. In this embodiment, the outputs of antenna elements RX1, RX2 are supplied to multipliers 352, 354. VRPC unit 350 is mathematically equivalent to VRPC unit 300, but effectively uses $P(t)=\Omega t$, where $\Omega=2\pi F$ to apply quadrature sinusoidal waveforms at the pseudo-Doppler frequency F to the inputs of each of multipliers 352, 354.

The multiplier 352, 354 outputs are subsequently combined by hybrid combiner 356 to yield output signals $Z_1$, $Z_2$. The switching and time-gating unit 358, 360 operates to provide a synchronous time-gating function to limit the two output signals $Z_1$, $Z_2$ to the time-intervals of validity when the desired fractional pseudo-Doppler frequency shift occurs Thus, much like the embodiment of VRPC unit 300, VRPC unit 350 yields output signal $Z_1/Z_2$ that appears to be shifted by a fraction of the pseudo-Doppler frequency, $Fkd/(2R)$, which functionally corresponds to the originally desired transverse-Doppler shift, $f_{Doppler}$.

OAM Pseudo-DOPPLER Simulation Results

Simulation trials were conducted based on the OAM pseudo-Doppler system architectures disclosed above. After modulation by the pseudo-Doppler waveforms, time-gating and down-conversion operations, the constellation and spectrum of the composite received signal are illustrated. The constellations pertain to the spectral replica centered at baseband (0 Hz frequency) in the spectral plots after the frequency shifting by the down-converter, reflecting a low-pass filtering operation performed in the simulation prior to demodulation. For simplicity of illustration, only one frequency-shift operation is performed in the down-converter, as opposed to the full structure of the OAM recovery scheme illustrated later in FIG. 6B.

FIGS. 4A, 4B depict the constellation plot and spectral characteristics of OAM mode 8 (OAM8) at a 0 Hz frequency shift in the down-converter, in accordance with various aspects of the present disclosure. Similarly, FIGS. 4C, 4D depict the 64 QAM constellation plot and spectral characteristics of OAM mode 1 (OAM1) at the 0 Hz frequency shift in the down-converter, in accordance with various aspects of the present disclosure.

The resulting spectral replicas of each of two simulated modes OAM8 and OAM1 that are transmitted and received separately are depicted by FIGS. 4B, 4D, respectively. The complex 64 QAM constellations are depicted by FIGS. 4A, 4C, respectively. It is apparent that each OAM mode has a different spectral envelope and that the baseband (centered at 0 Hz) spectral replica contains a different proportion of each OAM mode, as evidenced by the relative sizes of their constellations and corresponding baseband spectra.

Therefore, at a frequency shift of 0 Hz in the down-converter, OAM8 is superior to OAM1. With suitable scaling by a complex coefficient (i.e., amplitude and phase change), OAM8 could be recovered even in the presence of OAM1, and after suitable conventional equalization and decoding, its QAM data symbols may be successfully demodulated.

With a different frequency shift applied at the down-converter, different proportions of each OAM mode may be achieved and allow for the recovery of other OAM modes. Thus, FIGS. 5A, 5B depict the constellation plot and spectral characteristics of OAM8 at a 2F (i.e., twice the pseudo-Doppler modulation frequency) frequency shift in the down-converter, in accordance with various aspects of the present disclosure. Similarly, FIGS. 5C, 5D depict the constellation plot and spectral characteristics of OAM1 at the 2F frequency shift in the down-converter, in accordance with various aspects of the present disclosure.

As demonstrated by FIGS. 5A-5D, the OAM proportions of OAM8 and OAM1 are roughly the inverse of those shown in FIGS. 4A-4D. That is, at a frequency shift of 2F in the down-converter, OAM1 is superior to OAM8, so OAM1 could be similarly recovered and demodulated in the presence of OAM8.

Without any other signal processing, each OAM mode was recovered from the composite signal with a bit error rate (BER) on the order of $\approx 10^{-1}$. In general, the differences in relative proportions of OAM modes in the various spectral replica will not be as conveniently large as illustrated in simulated trials and they will need to be recovered from several spectral replicas by jointly inverting their proportions using a matrix-vector multiplication scheme, as illustrated later in FIG. 6B. Moreover, the expected spectral shifts by fractions of the pseudo-Doppler modulation frequency appear to be absent in all of the output spectral replicas, but they are actually present in their envelopes, as will be indicated by FIG. 6A.

OAM Pseudo-DOPPLER Recovery Scheme

Based on the simulation trials, the OAM signals are present in different proportions in the various harmonic spectral replicas of the composite received signal at the output of the gating subsystem of the OAM system architecture noted above. These proportions are determined by the physical parameters of the link, which can be made known to the receiver a-priori, to enable effective recovery of the OAM modes.

Moreover, the gating pseudo-Doppler modulations of the composite received signal evidence a "time-limited fractional frequency shift" operation in the discrete frequency domain. This may be recognized as the dual of a "frequency-limited fractional time shift", or band-limited fractional delay operation on a signal in discrete time domain. That is, the gating frequency, which is twice the pseudo-Doppler modulation frequency 2F and the fraction comprising the OAM spectral shift, $Fkd/(2R)$, correspond to the sampling interval and the fraction thereof, respectively, in the band-limited fractional-delay operation.

The correspondence to the sampling interval and the fraction thereof may be expected based on the duality relations that exist between time and frequency domains due to properties of the Fourier transform and its inverse. The property that sampling in the time-domain at intervals of T causes periodic extensions in frequency-domain by 1/T, also explains the received spectra observed in the simulation trials. The sampling operation is analogous to the time-gating functionality according to equation (1) and as depicted in FIG. 2C.

Moreover, as discussed above regarding the simulation results of OAM8 and OAM1 and depicted by FIGS. 4A-4D and 5A-5D, each OAM mode has a different spectral envelope and the corresponding spectral replicas contain different proportions of each OAM mode, as evidenced by the relative sizes of their constellations. The proportions of OAM modes in the spectral replicas are determined by the spectral envelopes and each OAM mode's spectral envelope exhibits its characteristic fractional pseudo-Doppler shift.

Figure 6A:
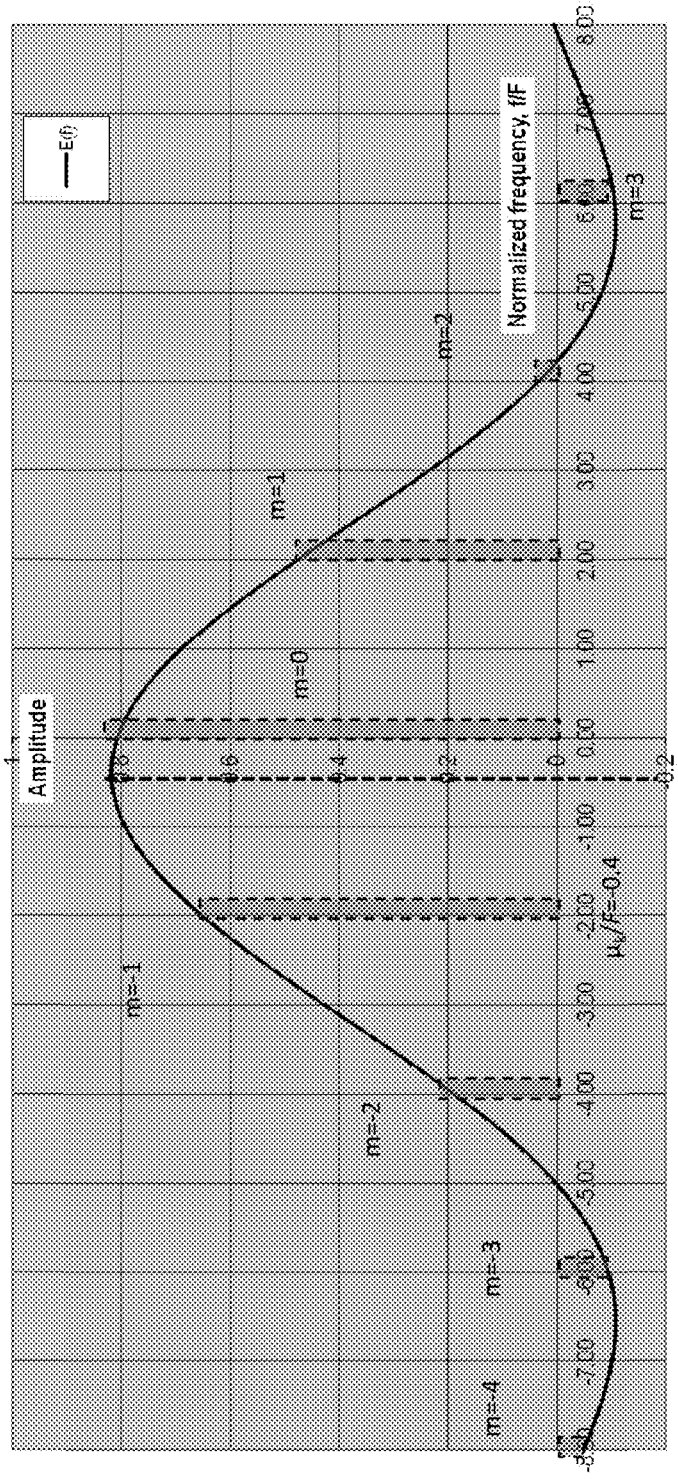
FIG. 6A illustrates a representative spectral envelope and replicas for OAM8, in accordance with various embodiments of the present disclosure.

These characteristic fractional shifts may be determined from information known at the receiver. For example, FIG. 6A illustrates a representative spectral envelope and replicas for OAM8, in which the fractional shift in the envelope is identified by the dashed vertical line and the spectral replicas are indexed by values of m.

Figure 6B:
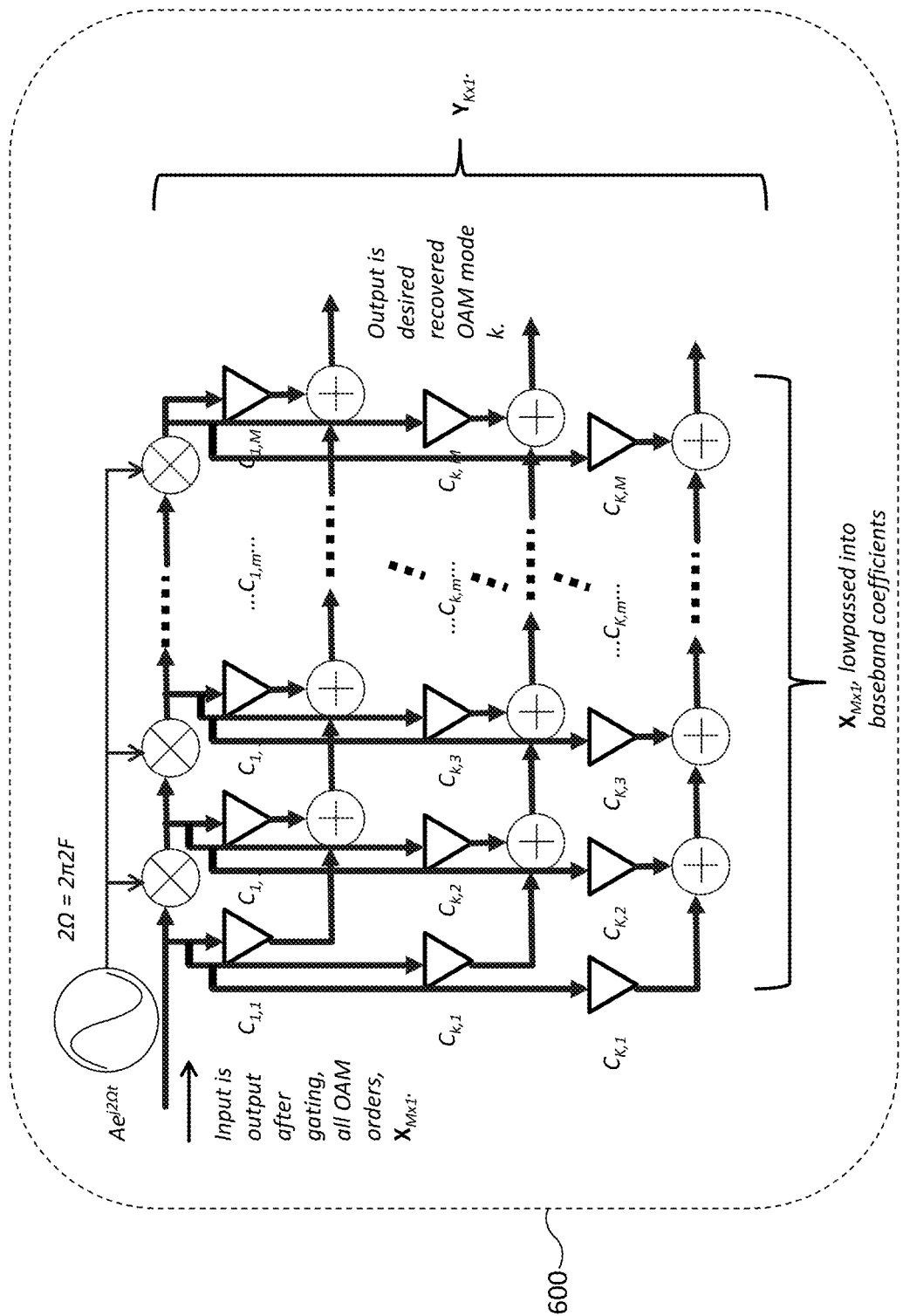
FIG. 6B illustrates a representative time-limited frequency-shift structure for the recovery of OAM modes, in accordance with various embodiments of the present disclosure.

FIG. 6B depicts a representative time-limited frequency-shift structure 600 for the recovery of OAM modes, in accordance with various aspects of the present disclosure.

Structure 600 provides an exemplary model for recovering a desired OAM mode from the superposition of all OAM modes that appear at the gating output of the pseudo-Doppler modulation subsystem.

As depicted, the gating output is passed through a series of down-converters that perform frequency-shifts at multiples of 2F to baseband and the resulting M low-pass filtered baseband components are represented in vector X. It will be appreciated that, while frequency-shifts at multiples of 2F is disclosed, it is not intended to be limiting, as frequency-shifts at other multiples of F may be suitably employed.

The k-th row of coefficients $\{C_{k,m}\}$ may then be used to recover the k-th order OAM mode from X, as the k-th entry of vector Y. Moreover, the entire broad-band spectrum of the gating output will contain spectral replicas of the transmitted signals located at the M harmonics of the pseudo-Doppler modulation frequency 2F. Further, it will be noted that the input and output signals of structure 600 are in the continuous-time domain and may also be in analog form.

In view of the above, the spectrum of each k-th order OAM mode at the gating output may be expressed as:

$$Z_{G,k,1}(f) = U_{k,CS}(f) \sum_{m=-\infty}^{\infty} S_k(f - m2F) \quad (10)$$

where U represents the spectral envelope.

The values of $U_k$ at spectral replica positions m can be arranged in a vector U of length M, and K such vectors determined for the K incident OAM modes. These may then be arranged column-wise in an M×K matrix U, and the input vector $X_{M\times 1}$ to each of the K down-converting coefficient branches may be expressed jointly as:

$$X_{M\times 1} = U_{M\times K} S_{K\times K} A_{K\times 1} \quad (11)$$

where $M \geq K$

Given these relationships, the incident OAM modes may be recovered by employing a pseudo-inverse of matrix U, as defined by:

$$U_{K\times M}^{\#} = [U_{K\times M}^{H} U_{M\times K}]^{-1} U_{K\times M}^{H} \quad (12)$$

which is equal to matrix C, containing the baseband weighting coefficients $\{C_{k,m}\}$ in FIG. 6B.

It then follows that a vector $Y_{K\times 1}$ of output OAM modes of length K may be obtained by:

$$Y_{K\times 1} = U_{K\times M}^{\#} X_{M\times 1} = S_{K\times K} A_{K\times 1} \quad (13)$$

This is because each envelope vector comprising the columns of matrix U is generally linearly independent of K−1 of the other vectors and the greater M is (i.e. the more spectral replicas are included in matrix U), the higher is the likelihood of that being the case.

The entries of output vector $Y_{K\times 1}$ may then be subsequently processed and equalized as in a conventional digital (i.e., QAM) receiver and demodulated into data streams. The demodulated data streams may then be recombined to form the final data output.

Figure 8A:
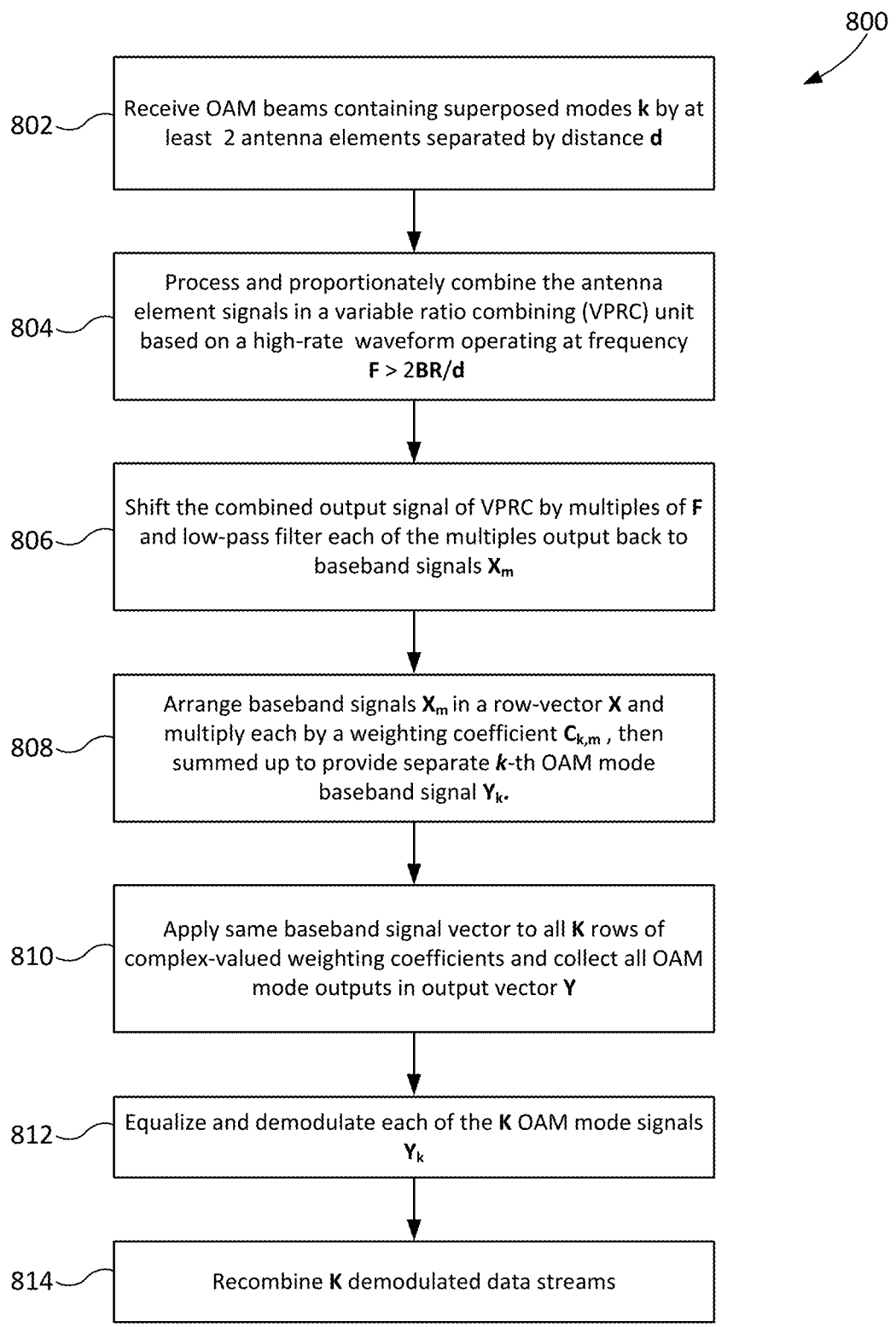
FIG. 8A illustrates a high-level functional flow diagram of an OAM signal recovery process, in accordance with various embodiments of the present disclosure.

With this said, FIG. 8A depicts a high-level functional flow diagram of OAM signal recovery process 800, in accordance with various embodiments of the present disclosure. As shown, process 800 begins at task block 802, in which mode k OAM beam signals manifesting different data streams per each mode k are received by at least two antenna elements. The at least two antenna elements are separated by distance d along a circular locus having a radius R corresponding to the footprint area of the received OAM beams and operate to output antenna element signals in response to the received OAM beam signals.

At task block 804, the outputted antenna element signals are processed and combined by a variable ratio combining unit, in accordance with a high-rate periodic waveform having a frequency F that is greater than 2BR/d, where B is the common bandwidth occupied by the transmitted and received OAM beam signals. The high-rate periodic waveform operates to control the rapid switching between portions of the outputted antenna element signals to emulate unidirectional movement by a virtual, interpolated receiver antenna element along the circumference of the circular locus. The emulated receiver antenna element movement produces a fractional pseudo-Doppler frequency shift that results from its passage through the characteristic phase gradient of each OAM beam footprint along the circular locus.

The high-rate periodic waveform also serves to modulate and time-gate the outputted antenna signals so as to limit them to the time-intervals during which fractional pseudo-Doppler shift imparted to each of the received OAM modes is valid and unidirectional. In so doing, the variable ratio combining unit operates to proportionally combine the modulated, time-gated antenna element output signals to form a broadband output signal at its output ports $Z_1$, $Z_2$.

At task block 806, the combined modulated, time-gated antenna element output signals are shifted by multiples of frequency F and then low-pass filtered to generate baseband signals $X_m$. At task block 808, the baseband signals $X_m$ are each multiplied by a weighting coefficient $C_{k,m}$ and then summed up to provide separate k-th OAM mode baseband signals $Y_k$. And, at task 810, process 800 operates to apply same baseband signal vector X to all K rows of the complex-valued weighting coefficients in order to collect all OAM mode outputs in output vector Y.

At task block 812, process 800 operates to equalize and demodulate each of the K OAM mode signals $Y_k$ and at task block 814, recombine the K demodulated data streams.

Figure 8B:
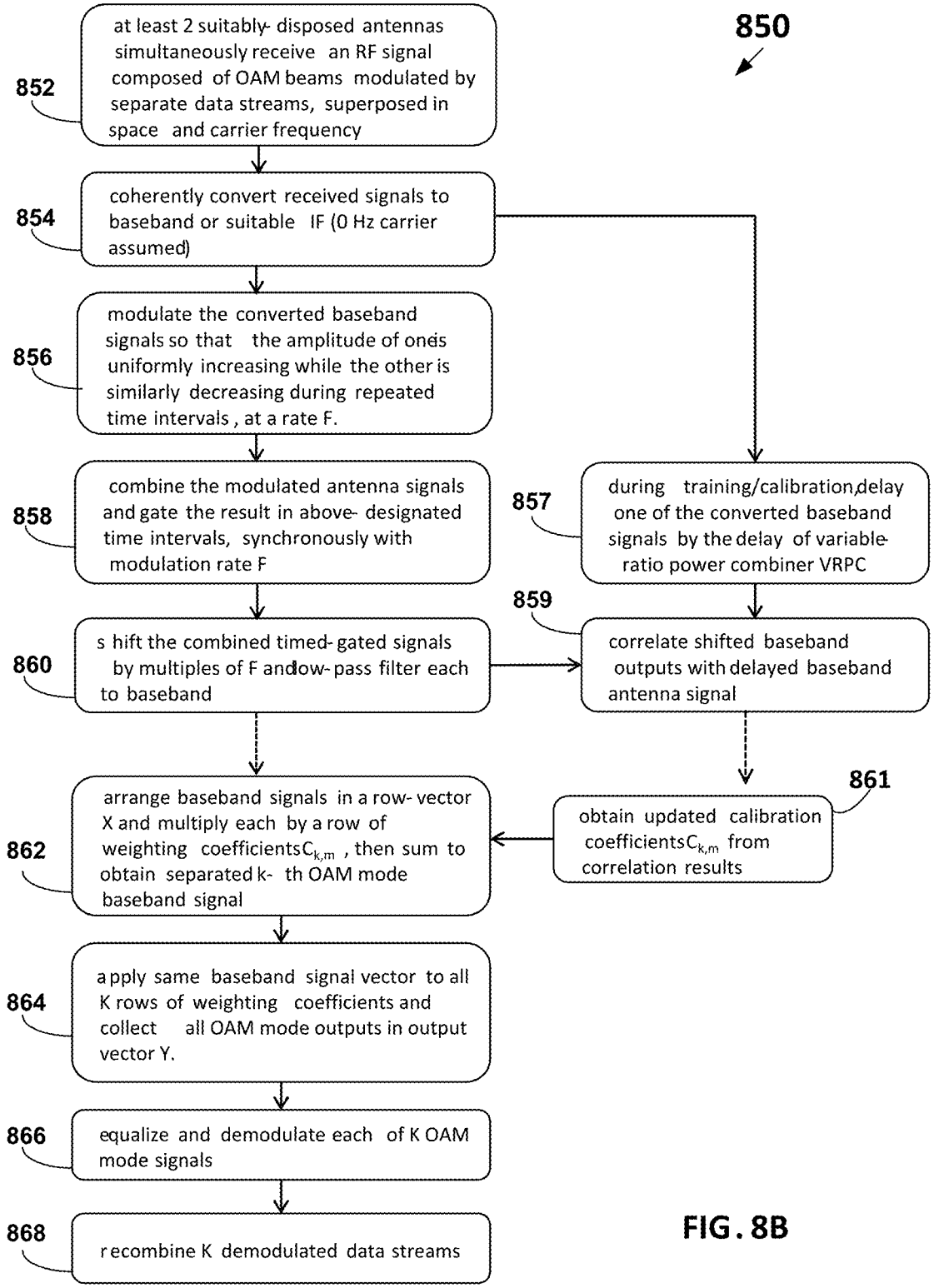
FIG. 8B illustrates a detailed functional flow diagram of the OAM signal recovery process, in accordance with various embodiments of the present disclosure.

FIG. 8B depicts a comprehensive detailed functional flow diagram of the OAM signal recovery process 850, in accordance with another embodiment of the present disclosure. As shown, process 850 begins at task block 852, in which at least two suitably-disposed antennas simultaneously receives an RF signal composed of OAM beams modulated by separate data streams that are superposed in space and carrier frequency. At task block 854, the received antenna signals are coherently converted to baseband or a suitable intermediate frequency IF (a 0 Hz carrier is assumed). The converted baseband antenna signals are also simultaneously forwarded to task 857 for operations during training or calibration modes.

At task 856, the converted baseband antenna signals are modulated such that the amplitude of one signal is uniformly increasing while the amplitude of the other signal is commensurately decreasing during repeated time intervals at a rate F. At task 858, the modulated antenna signals are combined and may be gated in accordance with the above-designated time intervals synchronously with modulation rate F. Then at task 860, the combined timed-gated signals are shifted by multiples of F and then low-pass filtered to baseband.

As noted above, the converted baseband antenna signals are simultaneously forwarded to task 857 in which, during training/calibration operations, one of the converted baseband antenna signals is delayed by the delay of a variable-ratio power combiner (VRPC). At task 859, the VRPC-delayed baseband signal is subsequently correlated with the shifted baseband signals produced by task 860 and, in task 861, updated calibration coefficients $C_{k,m}$ are obtained from the correlation results.

At task 862, the shifted baseband signals produced by task 860 are arranged in a row vector X, multiplied by the updated calibration coefficients $C_{k,m}$ produced by task 861, and then summed to obtain a separated k-th OAM mode baseband signal. In task 864, the same baseband signal vector operation is applied to all K rows of weighting coefficients and the K OAM mode baseband signals are collected in output vector Y.

At task 866, each of the K OAM mode baseband signals are equalized and demodulated and, at task 868, the K OAM mode baseband signals are recombined.

Extended OAM Pseudo-DOPPLER System Architecture

Figure 7:
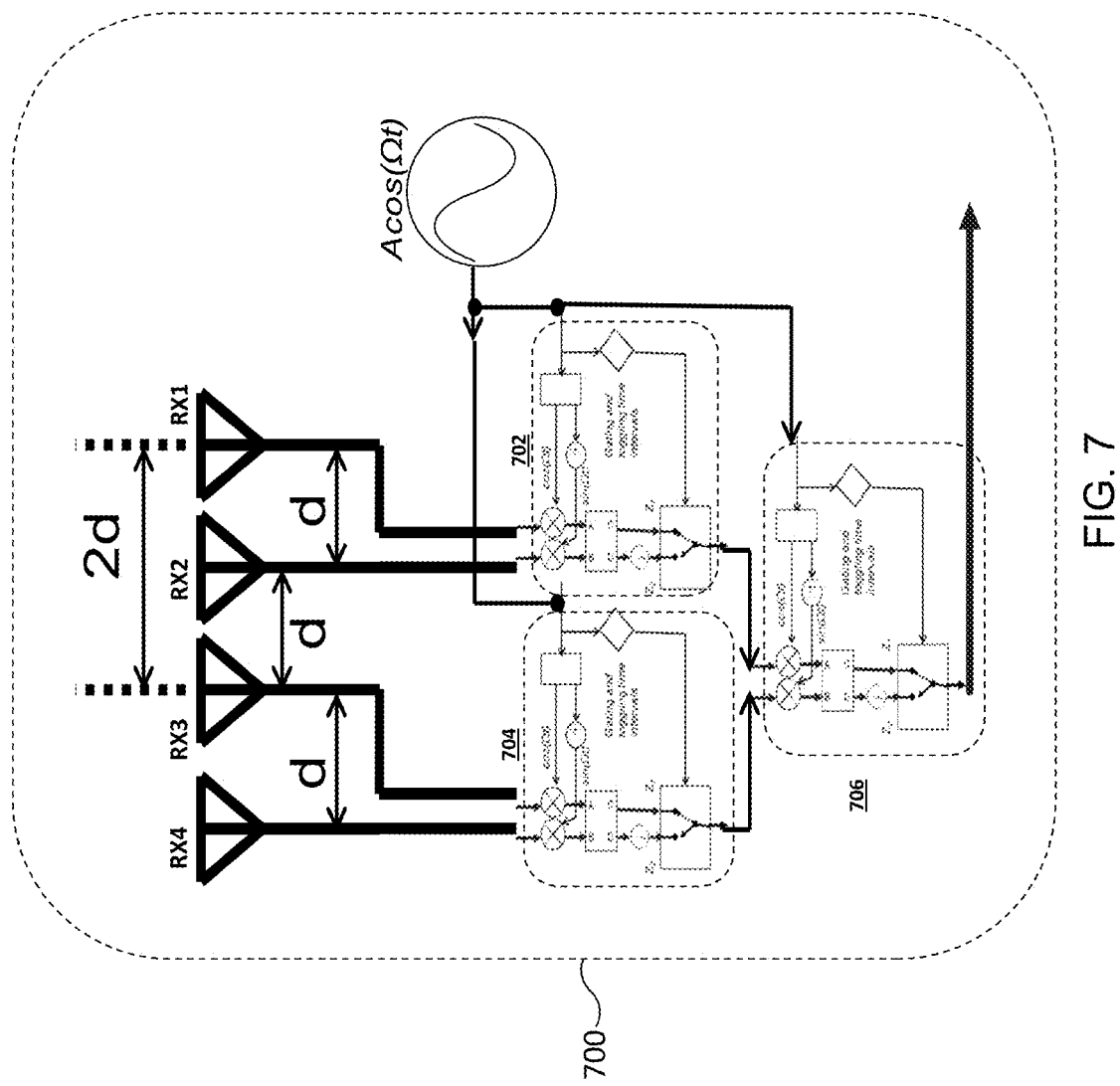
FIG. 7 illustrates an extended variable ratio power combining unit that incorporates a gating unit at the output to emulate unidirectional antenna element motion, in accordance with various embodiments of the present disclosure.

FIG. 7 depicts an extended VRPC unit 700 that also incorporates a gating unit at the output to emulate unidirectional antenna element motion, in accordance with various embodiments of the present disclosure. Extended VRPC unit 700 builds on the principles noted above to achieve greater sensitivity of the fractional pseudo-Doppler effect by incorporating multiple two-element pseudo-Doppler modulation subsystems to service more than two antenna elements.

In the illustrated embodiment, extended VRPC unit 700 is configured to service four antenna elements, RX1, RX2, RX3, RX4 by employing two first-stage two-element pseudo-Doppler modulation subsystems 702, 704, and a final-stage two-element pseudo-Doppler modulation subsystem 706. As shown, each of the modulation subsystems 702, 704, 706 embody the configuration of alternative VRPC unit 350 in which all of subsystems 702, 704, 706 are modulated synchronously with the same phase by the same source of $\Omega=2\pi F$. The two first-stage subsystems 702, 704 each operate to process two of the outputted antenna element signals, respectively, and the outputs of the first-stage subsystems 702, 704 are subsequently fed to final-stage modulation subsystem 706.

By virtue of the system architecture of extended VRPC unit 700 that is configured to service additional antenna elements, the signal amplitudes of the additional elements may combine coherently while noise may combine incoherently to yield improved SNR. Moreover, incorporating a second output may be useful in providing at least one of some diversity in the OAM recovery process and the use of multipath signals.

It will be noted that, if the two first-stage modulation subsystems 702, 704 were again separated by "d", the differences in their phases would appear in their $\psi_1(t)$ phase terms and result in a double fractional pseudo-Doppler shift at the output of final-stage modulation subsystem 706 whose inputs they provide. This is because the separation of their respective antenna elements would to be 2d. Theoretically that would add to the first-stage systems 702, 704 shifts to triple the fractional pseudo-Doppler frequency shift at the final second-stage output. The process could then be iterated for more elements and more stages of the original subsystem.

However, by just moving the original two antenna elements of one subsystem from d to the same total span of 3d would effectively achieve the same result, so there would be no net gain in doing so. Therefore, sub-dividing the separations to d/3 could conceivably improve the SNR with the same net fractional pseudo-Doppler shift. That could allow operation closer to the OAM beam axis where SNR is lower, but because R would also be lower, the net fractional pseudo-Doppler shift would be increased.

Moreover, by coinciding the gating intervals for $Z_1$, $Z_2$, makes their fractional pseudo-Doppler shifts opposite in sign within the same span d, so the resulting difference would be twice the size of the shift at one output. That may be exploited to enhance the separability of closely-spaced OAM modes or in their recovered SNR, or in separating multipath components which will have negative corresponding OAM orders for odd number of reflections.

OAM Pseudo-DOPPLER Receiver Scheme and System Architecture Advantages

By virtue of the disclosed embodiments, the described receiver system architecture and scheme avoids the need to have large, complex receiving antenna structures designed to capture the entire circumferential phase progressions of the OAM beam signals. Moreover, the disclosed system architecture and scheme overcomes the susceptibility to low SNR as well as the limitation in range distances, and the need to precisely align the TX and RX antenna structures. It also affords a K×K MIMO functionality without requiring K antennas at the receiver, as only 2 antennas are required to recover any number K of OAM mode signals with this inventive scheme.

In view of these attributes and capabilities, the described receiver system architecture and scheme may be advantageously integrated into existing and future MIMO and massive-MIMO receiver infrastructures.

MIMO Pseudo-DOPPLER Receiver

While the pseudo-Doppler receiving technique has been discussed above in the context of the recovery of OAM modes, those skilled in the art will appreciate that it may also be generalized to aid in the reception and recovery of signals transmitted using other MIMO modes. The pseudo-Doppler receiving technique may be applied to non-OAM MIMO radio links. Some of these techniques may be used to aid in the recovery and reception of signals transmitted over line of sight (LOS) MIMO radio links.

The apparatus and the method as described herein may also be used in NLOS MIMO radio links. In NLOS MIMO radio links, the recovered MIMO stream signals may be subject to equalization to compensate for the NLOS propagation effects.

Figure 9:
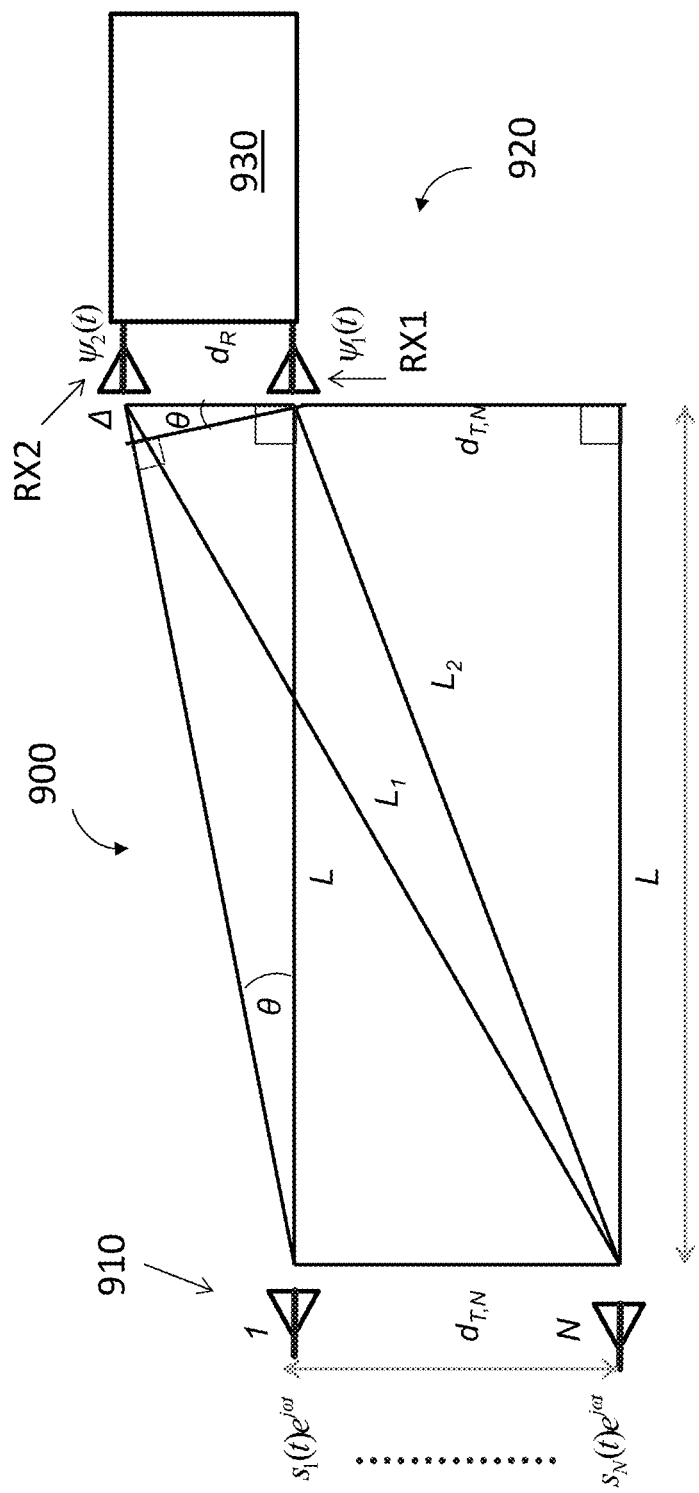
FIG. 9 depicts a high-level block diagram of a MIMO link with N MIMO transmitter antennas and a pseudo-Doppler receiver, in accordance with various embodiments of the present disclosure.

FIG. 9 is a high-level block diagram of a MIMO link 900. The transmitter makes use of N MIMO transmitter antennas 910 to send a signal to pseudo-Doppler receiver 920. In FIG. 9, MIMO transmitter antennas 910 are part of a uniform linear array (ULA) that radiate signals using MIMO modes. The radiated MIMO encoded signal is received by two receiver antenna elements RX1 and RX2 of pseudo-Doppler receiver 920. A MIMO VRPC unit 930 processes the signals received by the two receiver antenna elements RX1 and RX2.

Figure 10:
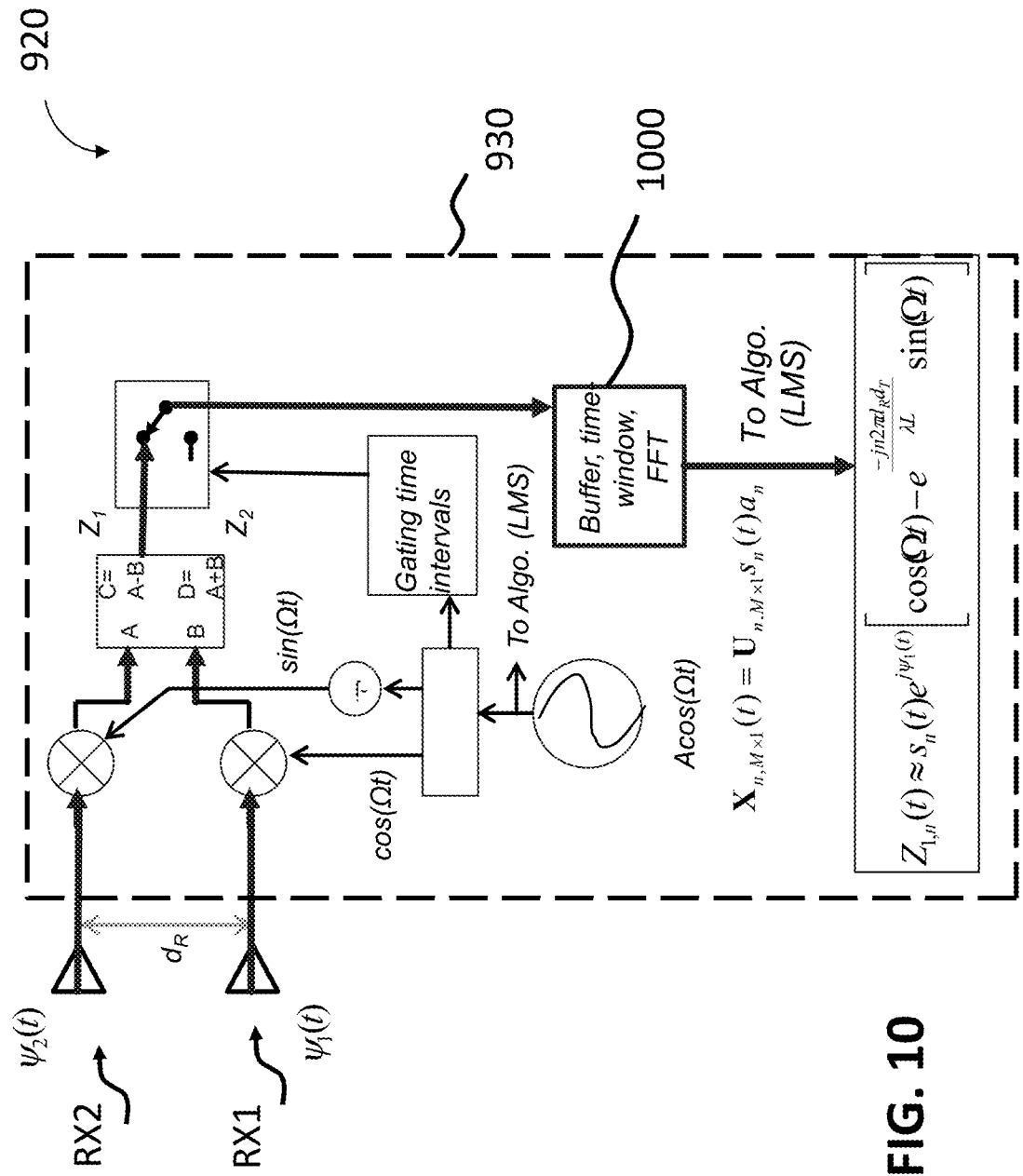
FIG. 10 depicts a high-level functional block diagram of MIMO receiver with MIMO variable ratio power combining unit, in accordance with various embodiments of the present disclosure.

FIG. 10 is a high-level functional block diagram of MIMO receiver 920 with MIMO VRPC unit 930, in accordance with various embodiments. The MIMO VRPC unit 930 has the same, or a similar, architecture as the VRPC unit 300 described above for OAM links in FIGS. 3A and 3B. Those skilled in the art will appreciate that in this illustrated embodiment, the architecture of the MIMO VPRC 930 comprises the same functional blocks as the VPRC 300 of the OAM receiver described above.

The two receiver antenna elements RX1 and RX2 of MIMO VPRC 930 effectively perceive the same phase gradients of the incoming LOS-MIMO waves from the N MIMO antennas 910, as they do when K OAM MIMO modes are received from the elements of a uniform circular array (UCA) antenna structure depicted in FIG. 2A. In other words, the wavefronts received from N MIMO transmitter antennas 910 in FIG. 9 and the wavefronts received from K OAM transmitter antennas in FIG. 2 may appear nearly identical when received by antenna elements RX1, RX2. Pseudo-Doppler signal-processing as described above may be applied to the signal received by the two receiver antenna elements RX1 and RX2 in order to recover the MIMO modes.

A conventional MIMO radio link typically requires N transmitting antennas and M>N receiving antennas. The antennae on both transmitting and receiving sides should be at least one of spatially distinct and electromagnetically diverse. Furthermore, distances between antennas of a conventional MIMO receiver need to be sufficiently large to account for the gain (multiplied by the lesser of M and N) in transmission capacity of the wireless MIMO link.

In some embodiments, the plane comprising MIMO transmitter antennas 910 may be located at any angle, other than 90 degrees, to the plane comprising antenna elements RX1, RX2. In some embodiments, the plane comprising MIMO transmitter antennas 910 may be parallel to the plane comprising antenna elements RX1, RX2.

The pseudo-Doppler receiver 920 described herein may have as few as two antenna elements RX1, RX2. Dimensions of an antenna array in the pseudo-Doppler receiver 920 may also be significantly smaller compared to the conventional MIMO receiver.

A link length L may be significantly longer in a MIMO link with the pseudo-Doppler receiver 920, compared to a MIMO link with the conventional MIMO receiver. A capacity of the LOS MIMO link with pseudo-Doppler receiver 920 may be less sensitive to the link length L compared to a link with the conventional MIMO receiver. The MIMO pseudo-Doppler receiver 920 may also operate with shorter link length L. An impact of variations of the link length L in LOS MIMO link on the signal reception quality may be mitigated by adjusting pseudo-Doppler modulation frequency F.

the use of pseudo-Doppler receiver 920 as a part of a MIMO link may mitigate common challenges of MIMO links such as sensitivity to a distance between adjacent transmitter antennas $d_T$ and sensitivity to a distance L between the transmitter and the receiver. The pseudo-Doppler receiver 920 may have as few as two receiver antenna elements and coherent receiver chains. It will also be understood that the pseudo-Doppler receiving techniques may also allow for mitigation of other known MIMO challenges including operation in the near-field, and reliance on a feedback signal for transmitting channel state information (CSI).

The frequency-domain coefficients may be adapted locally at the pseudo-Doppler receiver 920. In some implementations, the frequency-domain coefficients, obtained form matrix C, adapt by converging to their optimal values for recovering the OAM (and MIMO) signal streams. Although the frequency-domain coefficients may be directly computed, there may be unknown variations in the signal scenario, in the implementation, as well as equipment imperfections. Therefore, an optimization algorithm with training signal as discussed herein may be used to maintain optimal or approximately optimal frequency-domain coefficients. Those skilled in the art will appreciate that other algorithms may be used.

Adaptive algorithms, such as, for example, least-mean-squares (LMS) or Fast Robust Quasi-Newton algorithms, may be used to adapt the MIMO mode-recovery frequency-domain filter coefficients.

The pseudo-Doppler receiver 920 may also receive one frequency channel. A channel equalizer may be added to pseudo-Doppler receiver 920 in fading and/or NLOS environments.

The MIMO mode-recovery coefficients in the frequency-domain adaptive filters may be made adaptive, thus avoiding the need for reverse links transmitting channel-state information (CSI) to the transmitter for pre-coding as in prior-art MIMO. Other parameters may also be made adjustable as in the OAM embodiment described above.

The pseudo-Doppler signal processing may be applied to the separation and recovery of MIMO mode signal streams similarly to the embodiments described above for the recovery of OAM mode signal streams.

Recovery of the MIMO modes at the pseudo-Doppler receiver 920 is facilitated through use of the fractional pseudo-Doppler frequency shift imposed on the MIMO modes by the pseudo-Doppler frequency F. As discussed above for the OAM receiver, the pseudo-Doppler frequency F is the frequency of modulation of two receiver antenna signals that is applied in the MIMO VRPC unit 300. Referring to FIG. 9, the fractional pseudo-Doppler frequency shift may be expressed as:

$$\frac{n\pi F d_R d_T}{\lambda L}, \quad (14)$$

where n is an order of a MIMO mode, $d_R$ is the distance between the receiving antenna elements RX1, RX2 tangential to a transmitter antenna beam. L is a distance between the receiver 920 and the transmitter 910, also referred to herein as "link length L" and illustrated in FIG. 9. $d_T$ is the distance between adjacent transmitter antennas in a linear N-element array of a transmitter 910 in a LOS-MIMO link.

As described above, the OAM link parameters and the parameters of the two receiver antenna elements RX1, RX2 may satisfy the following relationship:

$$\frac{Fd}{2R} > B, \quad (15)$$

where B is the transmitted signal (or frequency-channel) bandwidth, d is the distance between the two antenna elements RX1 and RX2; F is the pseudo-Doppler frequency, and R is the radius of the conical OAM beam measured at link distance L from the transmitter.

Similarly, parameters of the LOS-MIMO link and parameters of the pseudo-Doppler receiver 920 used in the LOS-MIMO link 900 may satisfy the following relationship:

$$\frac{\pi F d_T d_R}{\lambda L} > B, \quad (16)$$

where $d_R$ corresponds to the distance d used above with respect to OAM received of FIG. 2A, $d_T$ is the distance between adjacent transmitter antennas 910 depicted in FIG. 9, and $\lambda$ is the RF carrier wavelength (radio frequency, for example, 28 GHz) and B is the bandwidth of the frequency-channel carrying all the MIMO or OAM modes (for example, 20 MHz).

To apply the above-disclosed pseudo-Doppler technique to a MIMO link, such as, for example, to LOS-MIMO link, one may replace the OAM parameters with the corresponding MIMO-related parameters in the equations described above for the OAM link.

Relationships between the OAM link parameters and the MIMO link parameters may be determined when observing the geometry of MIMO link with MIMO receiver 920 depicted in FIG. 9. In particular, one may derive the following relations between parameters of the MIMO receiver and the link length L:

$$\Delta = d_R \sin(\theta), \tag{17}$$

$$\sin(\theta) = \frac{d_R}{L}. \tag{18}$$

Therefore, the relationship between the respective phases $\psi_1$, $\psi_2$ of receiver antenna elements RX1, RX2 at time t may be expressed as follows:

$$\psi_2(t) = \psi_1(t) - \left(\frac{2\pi\Delta}{\lambda}\right) = \psi_1(t) - \left(\frac{2\pi d_R^2}{\lambda L}\right). \tag{19}$$

Referring again to FIG. 9, a second distance $L_2$ measured between the Nth antenna of MIMO transmitter 910 and second receiver RX2 may be expressed as:

$$L_2^2 = L^2 + d_{T,N}^2. \tag{20}$$

A first distance $L_1$ measured between the Nth antenna of MIMO transmitter 910 and first receiver antenna element RX1 may be expressed as:

$$L_1^2 = L^2 + (d_{T,N} + d_R)^2. \tag{21}$$

Using the equation $L_1^2 - L_2^2 = (L_1 - L_2)(L_1 + L_2)$, one may derive a similar phase-shift between RX1 and RX2, due to the path length difference from the N-th transmit antenna and denoted by $\Delta_N$, as follows:

$$\Delta_N = L_1 - L_2 = \frac{L_1^2 - L_2^2}{L_1 + L_2} = \frac{d_R^2 + 2d_R d_{T,N}}{L_1 + L_2}. \tag{22}$$

By assuming that $L_1 \approx L_2 \approx L$, and that $L \gg d_{T,N}, d_R$, $\Delta_N$ may be expressed as follows:

$$\Delta_N \approx \frac{d_R^2}{2L} + \frac{d_R d_{T,N}}{L} \approx \frac{d_R d_{T,N}}{L} \tag{23}$$

It was also assumed above derivation that:

$$d_{T,n} = n d_T, \tag{24}$$

$$d_T \gg d_R. \tag{25}$$

The relationship between LOS-MIMO parameters of FIG. 9 and the OAM parameters may be derived using the geometry of the OAM antennas as follows. The far-field amplitude of the K-th OAM mode radiated by a circular ring antenna array having radius $r_k$ is proportional to $$G_k(\theta, \phi) \approx (-j)^k e^{jk\theta} J_k\left(\frac{2\pi r \sin\phi}{\lambda}\right) \tag{26}$$

where $\phi$ is the angle calculated from an axis of the OAM conical beam, $\theta$ is the azimuthal angle around the circumference of the UCA and $J_k(\ )$ is the k-th order Bessel function of the first kind. Using the approximation:

$$\sin(\phi) = \frac{R}{L}, \tag{27}$$

and the observation that the peaks of the Bessel functions describe the OAM conical beams:

$$\underset{x}{\text{Max}} J_k(x) \approx (k+1), \tag{28}$$

$$x = \frac{2\pi r \sin(\phi)}{\lambda} \approx k+1, \tag{29}$$

one may derive the following approximation:

$$\frac{2\pi r_k R}{\lambda L} \approx k+1 \Rightarrow r_k \approx \frac{(k+1)\lambda L}{2\pi R}. \tag{30}$$

Equation (30) may be re-written to provide the following relationship between dimensions of OAM and MIMO antennas:

$$2r_k = nd_T \rightarrow R \approx \frac{2(n+1)\lambda L}{2\pi n d_T}. \tag{31}$$

Equation (31) is similar to the following relationship derived based on differential receiver signal phases that are exploited by the pseudo-Doppler effect for large-order MIMO modes, n≫1:

$$2r_k = nd_T \rightarrow R \approx \frac{2\lambda L}{2\pi d_T}. \tag{32}$$

As discussed above for the OAM link, the output for the combined modulated receiver OAM signals before time-gating in the VRPC unit 300 may be expressed by equation (8). Provided that P(t)=Ωt, the output for the combined modulated receiver OAM signals before time-gating in the VRPC unit 300 may be expressed as:

$$Z_{1,k}(t) = s_k(t)e^{j\psi_1(t)}\left[\cos(\Omega t) - e^{\frac{-jkd}{R}}\sin(\Omega t)\right]. \tag{33}$$

After time-gating, the combined modulated receiver OAM signals in the VRPC unit 300 may be expressed as:

$$Z_{1,k}(t) \approx \sqrt{2} S_k(t) e^{j\left(\psi_1(t) - \frac{kd}{2R}\right)}(\cos(\Omega t + \pi/4))e^{j\left(\frac{kd}{2R}\right)(\Omega t + \pi/4)}. \tag{34}$$

Using the relationship (32) between the OAM link parameters and the MIMO link parameters, a combined modulated receiver LOS-MIMO signals before time-gating in MIMO VRPC unit 930 may be expressed as:

$$Z_{1,n}(t) \approx s_n(t)e^{j\psi_1(t)}\left[\cos(\Omega t) - e^{\frac{-jn2\pi d_R d_T}{\lambda L}}\sin(\Omega t)\right]. \quad (35)$$

After time-gating, combined modulated receiver LOS-MIMO signals may be expressed as follows:

$$Z_{1,n}(t) \approx \sqrt{2}\, s_n(t)e^{j\left(\psi_1(t) - \frac{n2\pi d_T d_R}{2\lambda L}\right)}(\cos(\Omega t + \pi/4))e^{j\left(\frac{n2\pi d_T d_R}{2\lambda L}\right)(\Omega t + \pi/4)}. \quad (36)$$

Figure 11:
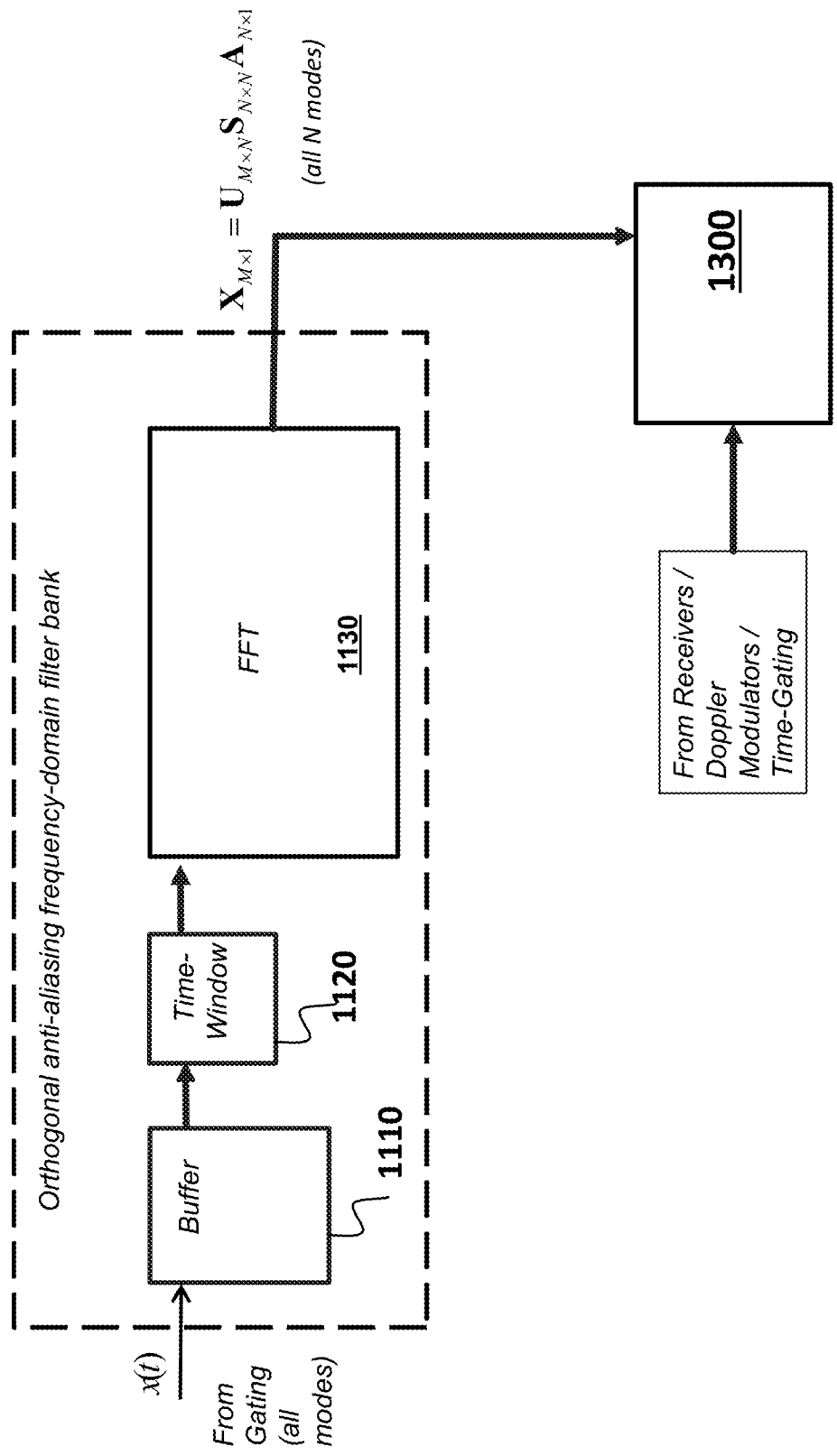
FIG. 11 depicts a block diagram of a non-limiting example of an orthogonal anti-aliasing frequency domain filter bank of FIG. 10, in accordance with at least one non-limiting embodiment of the present disclosure.

FIG. 11 depicts a block diagram of a non-limiting example of an orthogonal anti-aliasing frequency domain filter bank 1000 of FIG. 10, in accordance with at least one non-limiting embodiment of the present disclosure. The signal that is received from gating passes though a buffer block 1110, which accommodates (stores) $N_{FFT}$ samples of it. This effectively transform the signal into a vector of the same length. When generating such vector representation of the output signal of the synchronous time-gating unit, the buffer block 1110 discards the earliest sample and appends the latest one, while shifting the other samples by one sample. A time window can be applied to that vector at a time-window block 1120 to generate a time window output. The time window output is then transmitted to a Fast-Fourier-Transform (FFT) block 1130. FFT is then applied to the time window output at the FFT block 1130.

In the illustrated embodiment, an effective frequency-domain filter bank 1000, is formed using a FFT matrix to multiply the sample vector, thereby selecting each spectral component. The filter bank 1000 can also serve as an anti-alias filter. The size of the filter bank 1000 may be expressed as:

$$N_{FFT} = \frac{PF_S}{2F_{Doppler}}, \quad (37)$$

where P is an integer, $F_S$ is the sampling frequency and $F_{Doppler}=F$ is the pseudo-Doppler modulation frequency.

In at least one embodiment, the time window is such that its FFT has zeros at intervals of $2F_{Doppler}$. The time window may be, for example, rectangular or triangular, as long as it results in orthogonal frequency responses after multiplication by the FFT matrix.

Figure 12:
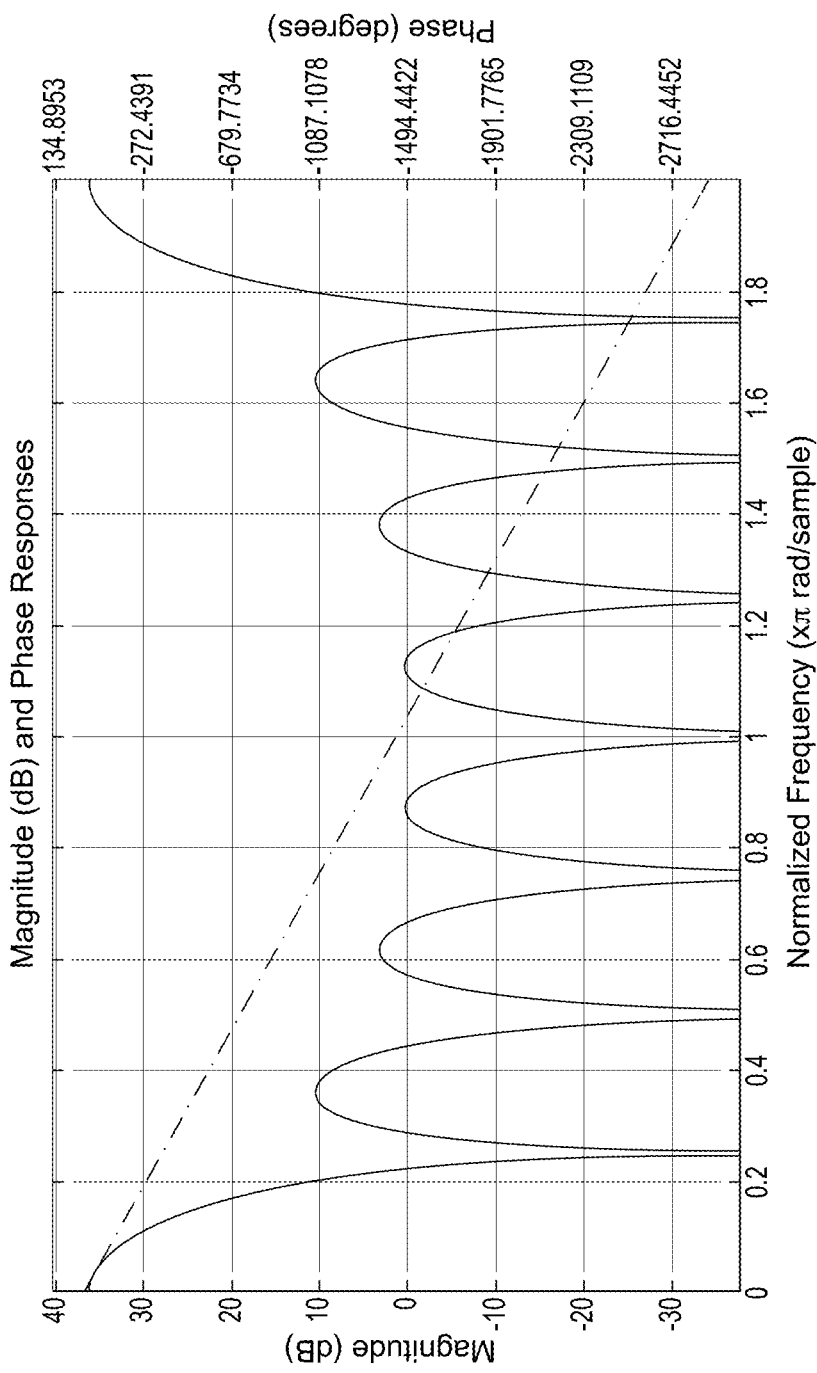
FIG. 12 depicts a triangular time window with P=2 and its fast-Fourier-transform (FFT) for the 0 Hz frequency component, in accordance with at least one non-limiting embodiment of the present disclosure.

FIG. 12 illustrates the magnitude and phase of the frequency-response the FFT of a triangular time window 1120 with P=2 and its FFT for the 0 Hz frequency component. The buffer length corresponds to an FFT size, and a buffer overlap may be equal to FFT size minus one.

After the FFT has been applied at block 1130, the M (where M is at least N, or K in case of OAM) non-zero spectral components of the output of filter bank 1000 at multiples of 2F are then arranged into a vector X(t). Vector X(t) describing N MIMO modes is then transmitted to a frequency-shift and adaptive coefficient weighting structure 1300 (also referred to herein as "frequency-shift MIMO structure 1300").

Figure 13:
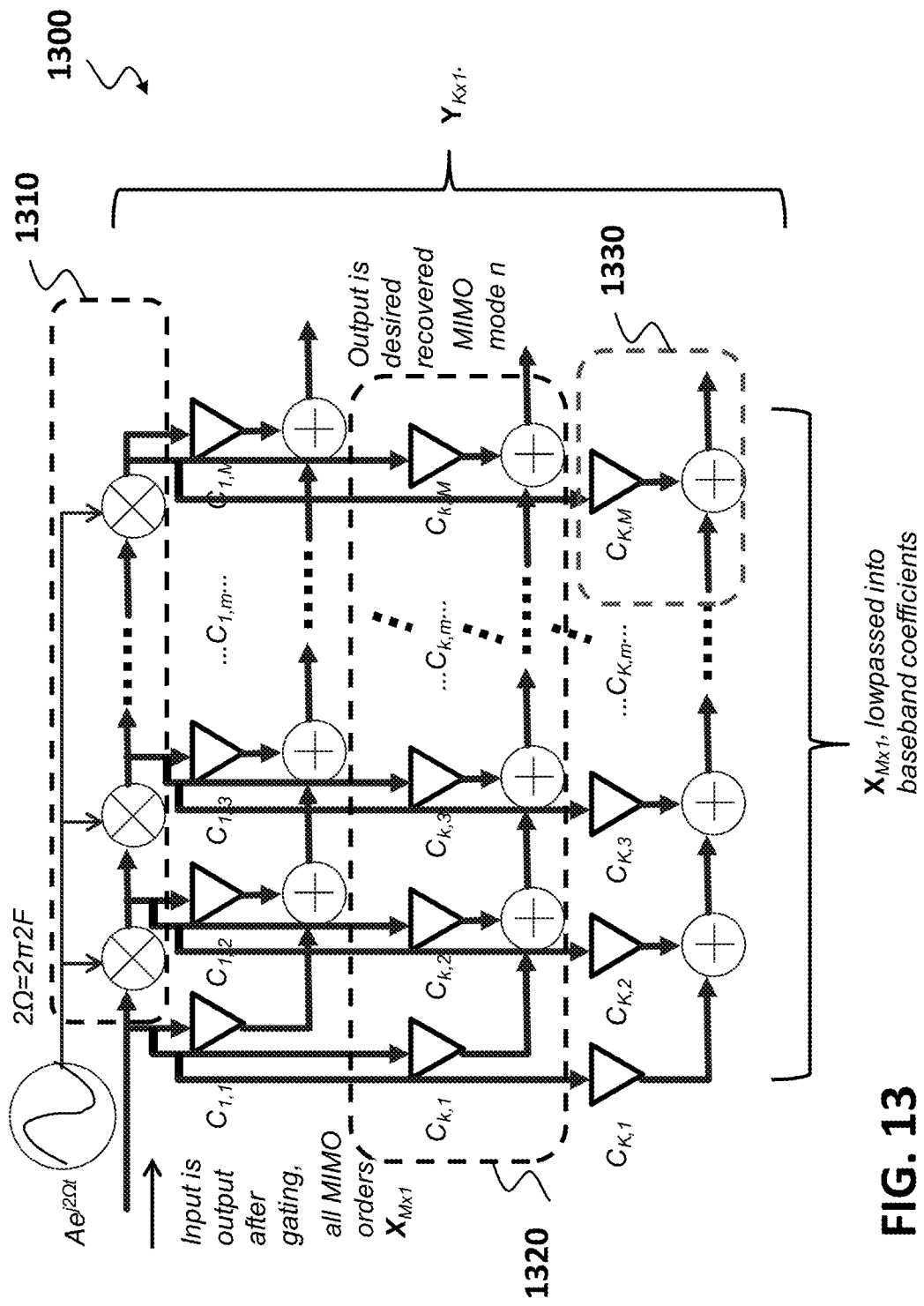
FIG. 13 depicts a time-limited frequency-shift MIMO structure for the recovery of MIMO modes, in accordance with various aspects of the present disclosure.

FIG. 13 illustrates an example of the frequency-shift MIMO structure 1300 for the recovery of MIMO modes. Each spectral component can be selected and shifted in frequency to a baseband (i.e. 0 Hz center frequency). The frequency-shift MIMO structure 1300 is identical to frequency-shift structure 600 described above for the recovery of OAM modes. Multipliers 1310 in FIG. 13 perform pseudo-Doppler frequency translations to baseband (0 Hz).

Figure 14A:
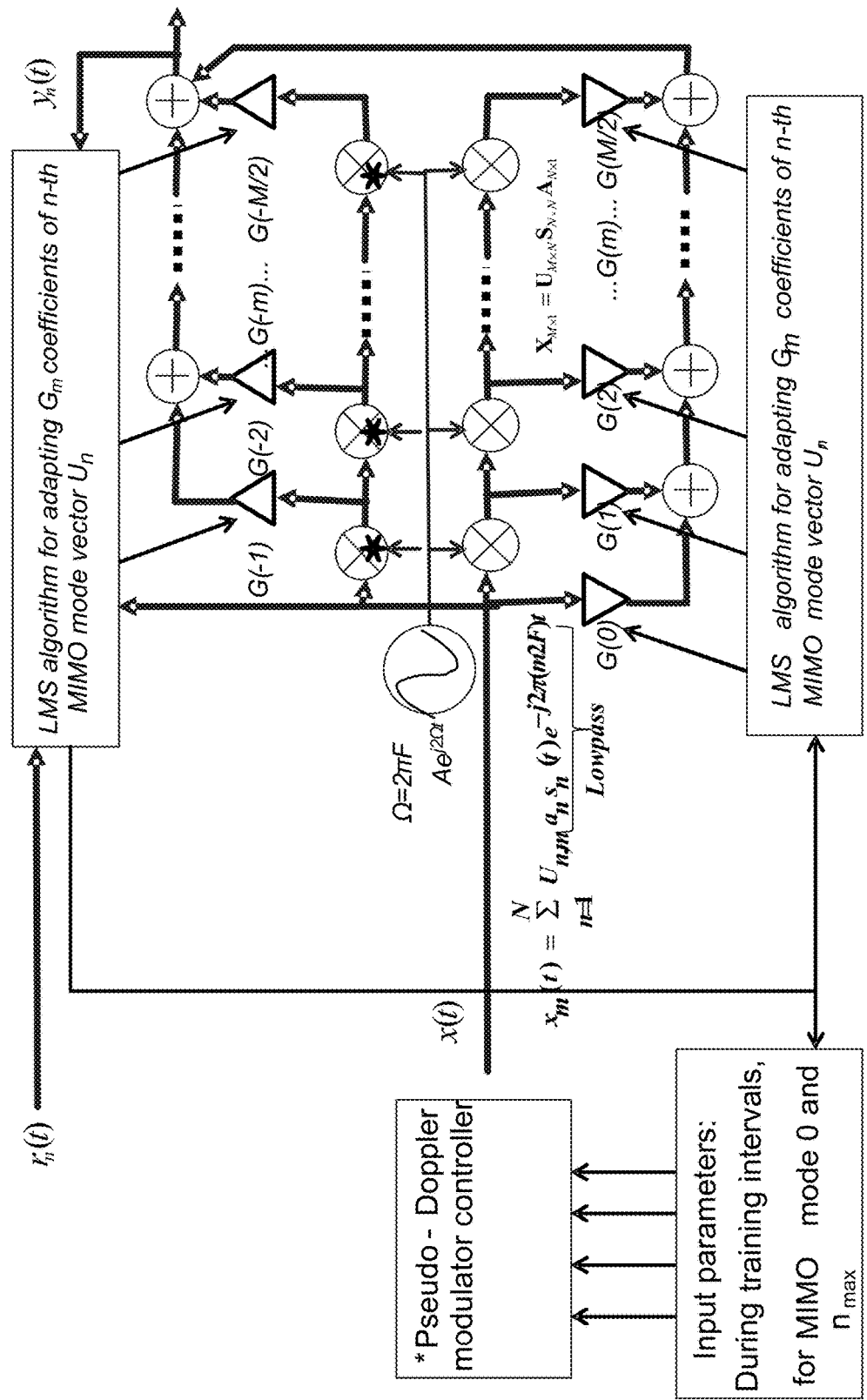
FIG. 14A illustrates a portion of the time-limited frequency-shift MIMO structure of FIG. 13, implemented in accordance with at least one embodiment of the present disclosure.

FIG. 14A illustrates a portion 1320 of the frequency-shift MIMO structure 1300, of an embodiment of the present invention. This portion 1320 corresponds to M adaptive coefficients contained in the n-th row of matrix C, for recovering the n-th MIMO mode; it is further detailed in FIG. 14B. The method uses a Least Mean Squares (LMS) algorithm to adapt the MIMO mode-recovery coefficients that are applied to the output vector of the frequency-domain filters after shifting them to baseband.

The spectral outputs of the FFT block 1130 are shifted by modulating an output signal of the FFT block 1130 with a periodic waveform and low-pass filtering them to generate baseband signals. The baseband signals are then multiplied by weighting coefficients G(m) or G(−m) as depicted in FIG. 14A. The weighted baseband signals are then summed up to provide separate n-th MIMO mode baseband signals. The summed output of the G-coefficient blocks in FIG. 14A provide estimates of the recovered n-th MIMO mode data modulation waveform. To generate adapted weighting coefficients G (m), an error signal may be determined by subtracting the separate n-th MIMO mode baseband signal from reference signal $r_n(t)$ and integrating the result.

Figure 14B:
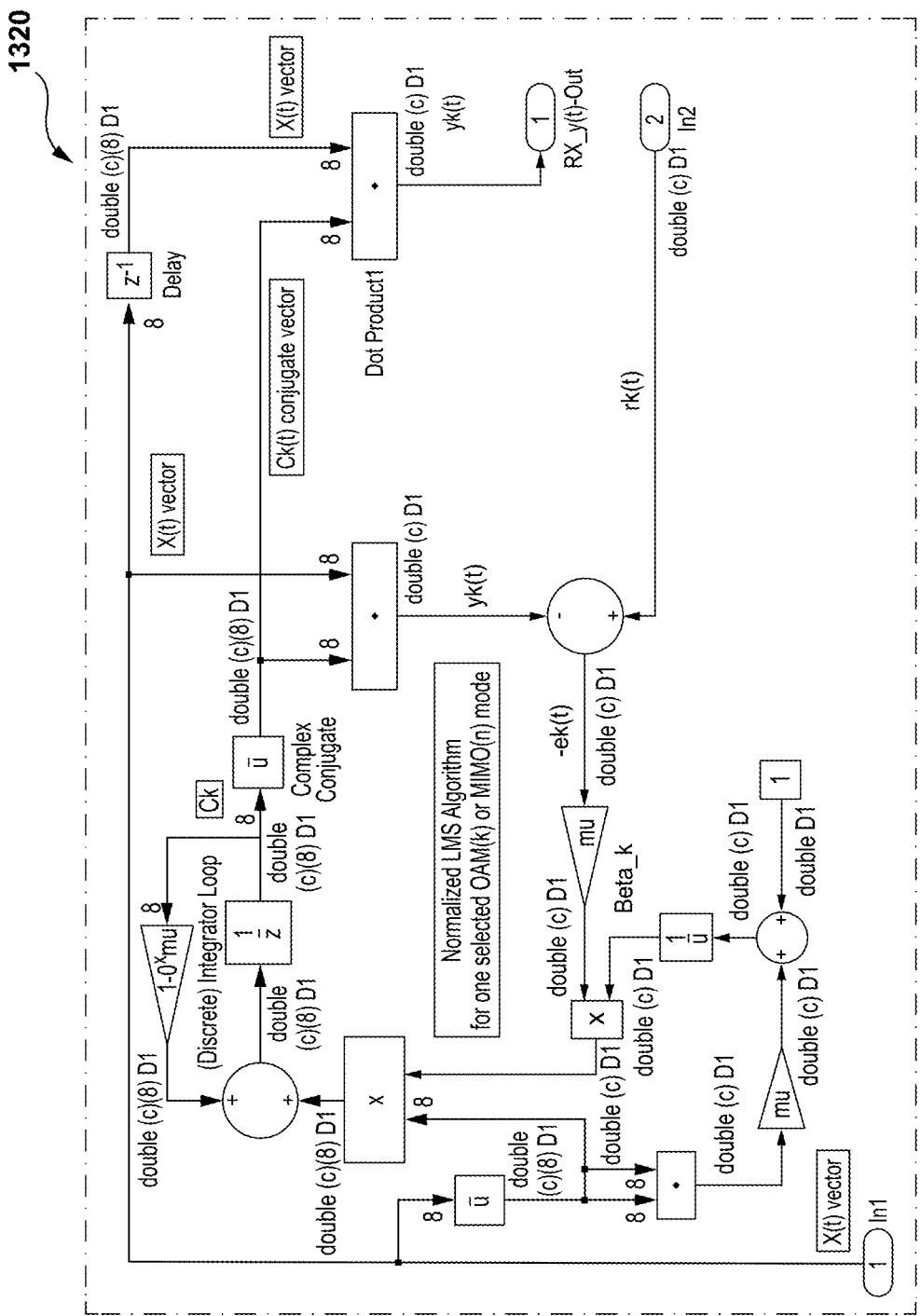
FIG. 14B depicts a non-limiting example of the portion of the time-limited frequency-shift MIMO structure of FIG. 13, implemented in accordance with at least one embodiment of the present disclosure.

FIG. 14B depicts a non-limiting example of portion 1320 of the frequency-shift MIMO structure 1300, corresponding to recovery of one MIMO (or OAM) mode and implemented in accordance with at least one embodiment of the present disclosure.

The following equations may be used to determine the asymmetry of the branches of the recovery filters to guide the antenna switching and phase-alignment of the receiver branches and the role of the reference signal r(t) from the unmodulated and/or un-gated received signal (known and/or stored at MIMO receiver 920).

A fractional pseudo-Doppler shift in the n-th branch of MIMO receiver 920 corresponds to a weighting coefficient of row n of vector X(t). The fractional pseudo-Doppler shift in the n-th branch of MIMO receiver 920 may be derived from the following equations:

$$X_{M \times 1}(t) = U_{n, M \times 1} s_n(t) a_n \quad (38)$$

$$e_n(t) = G_n^H(t) X_n(t) - r_n(t) \quad (39)$$

$$e_n^*(t) X_n(t) = \tau \frac{d}{dt} G_n(t) \quad (40)$$

$$r_n(t) = e^{j\psi_1(t)} s_n(t) a_n \Rightarrow G_n \propto U_n, \quad (41)$$

wherein, for the n-th MIMO mode, $X_n(t)$ is the column vector of the M down-shifted outputs of the FFT-based filter bank corresponding to the n-th MIMO mode; $U_n$ is the corresponding column vector of M samples of its spectral envelope as affected by the pseudo-Doppler processing of the two receiver outputs; $s_n(t)$ is its data-modulation waveform having bandwidth B and received with amplitude $a_n$; $r_n(t)$ is a training or reference waveform correlated with the data-modulation and known at the receiver, while $e_n(t)$ is the error between the estimated recovered n-th mode data waveform $y_n(t)$ and the reference. The M adaptive weighting coefficients vector $G^H_n$ is one row of the complete adaptive coefficient matrix C; it is applied to X(t), which contains all the N modes, the result being a recovered version of the n-th mode data-modulation signal.

Thus, the baseband weighting coefficient row vector $C_n$ discussed above modes relates to MIMO baseband weighting coefficient column $G_n$ as follows:

$$C_{n,-M/2 \ldots M/2} = G_n^H, \quad (42)$$

where superscript H denotes conjugate transpose.

A complete coefficient matrix may be expressed as:

$$X_{M\times 1}(t) = U_{M\times N} S_{N\times N}(t) A_{N\times 1} \quad (43)$$

$$R_{N\times 1}(t) = S_{N\times N}(t) A_{N\times 1} \quad (44)$$

$$Y_{N\times 1}(t) = C_{N\times M} X_{M\times 1}(t) \quad (45)$$

$$E_{N\times 1}(t) = Y_{N\times 1}(t) - R_{N\times 1}(t) \quad (46)$$

$$\tau \frac{d}{dt} C_{N\times M}(t) + \varepsilon C_{N\times M} = \overline{-E_{N\times 1}(t) X_{1\times M}^H(t)}, \quad (47)$$

where $X(t)$ is the sum of all modes' vectors $\{X_n(t)\}$, $S(t)$ is a diagonal matrix of all N modes' data-modulation waveforms, A is the vector of amplitudes of the N received mode signals. $R(t)$ is the vector of all N reference or training signals, $E(t)$ is the vector of all N error signals and $Y(t)$ is the vector of all N recovered (estimated) data-modulation waveforms carried in the N modes. The scalar $\varepsilon$ denotes thermal noise plus the leakage factor of the integrators employed in the adaptive LMS algorithm; it is vanishingly small compared to the modes' signal power.

Figure 15:
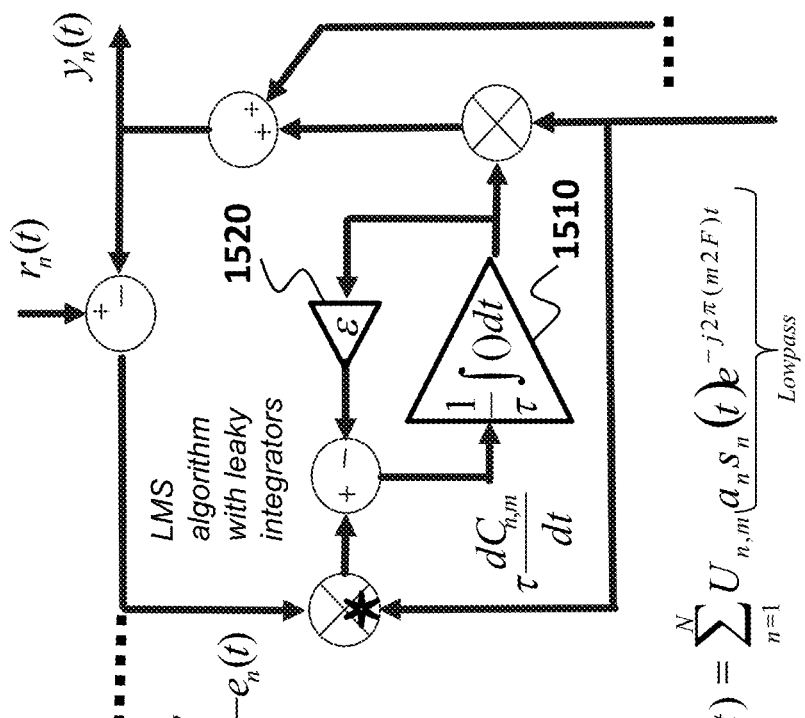
FIG. 15 depicts a block diagram of a non-limiting example of implementation of a least-mean-squares (LMS) algorithm with leaky integrators, in accordance with at least one embodiment on the present disclosure.

The operations of equations (44)-(47) may be implemented using, for example, the LMS algorithm with leaky integrators, following the matrix pattern of FIG. 13, made up of the vector patterns of FIG. 14A, which are in turn made up of the scalar patterns detailed in FIG. 15.

FIG. 15 depicts a block diagram of a non-limiting example of an LMS unit 1330, in accordance with at least one embodiment on the present disclosure. The LMS unit 1330 implements the LMS algorithm with leaky integrators. In such LMS unit 1330, a value of X vector is multiplied by a reference signal $r_n(t)$. Integration of changes in a coefficient $C_{n,m}$ is performed in an integrator block 1510. A leaky coefficient E is applied at block 1520 to provide a feedback of such change. The weighted spectral lines that were converted previously to the baseband, are summed in LMS units 1330. The output of LMS units 1330 is summed together to form nth output $y_n(t)$ to obtain an estimate of the n-th MIMO data waveform.

Equation (47) may also be written as follows:

$$\tau \frac{d}{dt} C(t) = \overline{-CUS(t)AA^H S^H(t) U^H - \varepsilon C + S(t) A A^H S^H(t) U^H}, \quad (48)$$

where the following is diagonal:

$$\overline{S(t) A A^H S^H(t)} = P_{N\times N}, \quad (49)$$

because:

$$\overline{s_n(t) a_n a_n^* s_j^*(t)} = p_n \delta_{nj}. \quad (50)$$

The following equations may be derived for the coefficient matrix C:

$$CUPU^H + C[\varepsilon I] - PU^H = -\tau \frac{d}{dt} C(t) \to 0 \quad (51)$$

-continued $$C[UPU^H + \varepsilon I] = PU^H, \varepsilon \ll p_{n,min}$$

$$C = PU^H [UPU^H + \varepsilon I]^{-1}$$

$$\lim_{\varepsilon \to 0} C = PU^H [UPU^H]^{\#} = PU^H [U^H]^{\#} P^{-1} U^{\#}$$

$$C = PP^{-1} U^{\#}.$$

Therefore, one may derive the coefficient matrix C as a function of U:

$$C = U^{\#} = [U^H U]^{-1} U^H. \quad (52)$$

Figure 16A:
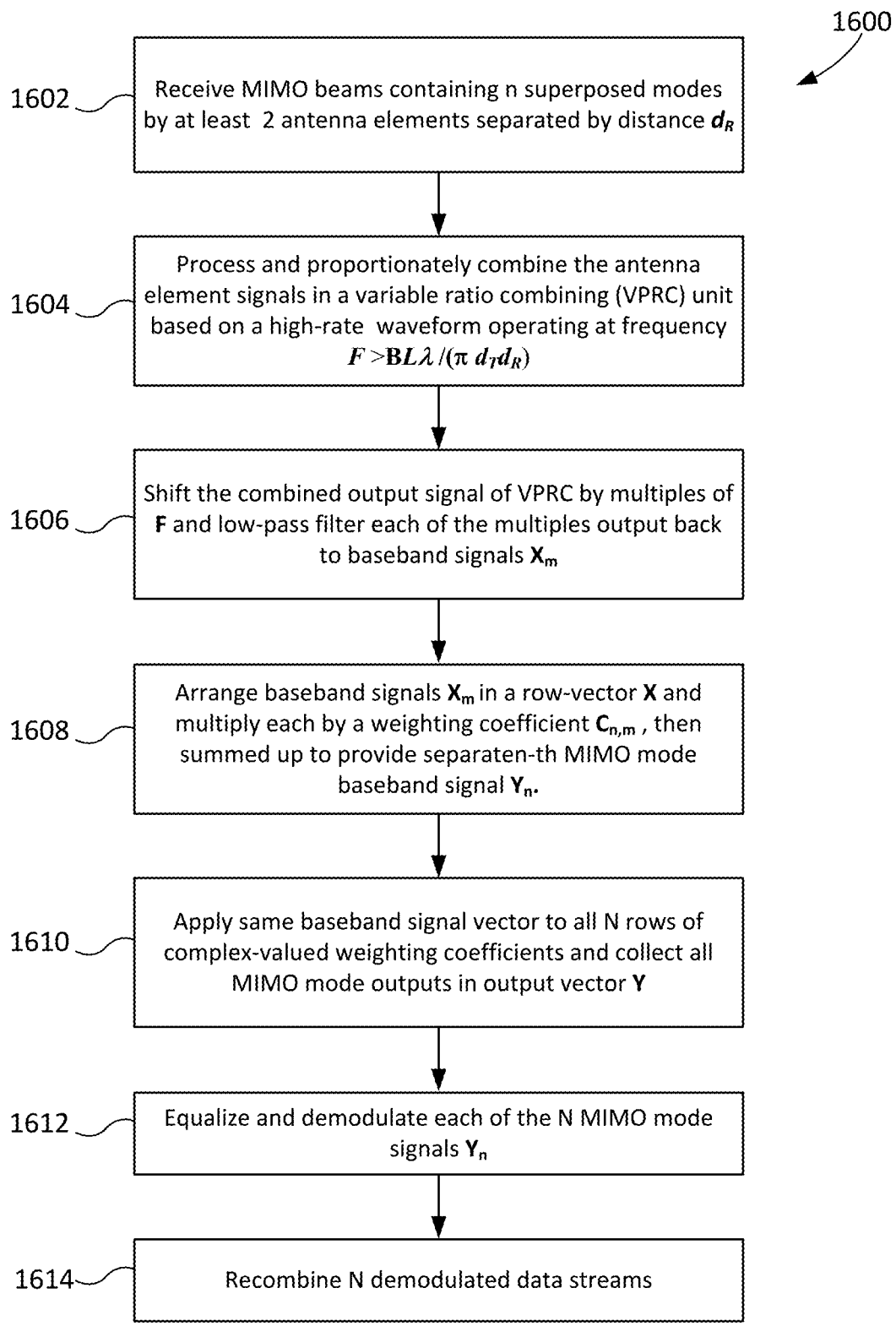
FIG. 16A depicts a high-level functional flow diagram of MIMO signal recovery process, in accordance with various embodiments of the present disclosure.

FIG. 16A depicts a high-level functional flow diagram of MIMO signal recovery process 1600, in accordance with various embodiments of the present disclosure.

As shown, process 1600 begins at task block 1602, in which mode n MIMO beam signals manifesting different data streams per each mode n are received by at least two antenna elements. The at least two antenna elements are separated by distance $d_R$ and operate to output antenna element signals in response to the received MIMO beam signals.

At task block 1604, the outputted antenna element signals are processed and combined by a variable ratio combining unit, in accordance with a high-rate periodic waveform having a frequency F that is greater than $F > B\lambda L/(\pi d_T d_R)$, where B is the common bandwidth occupied by the transmitted and received MIMO beam signals. The high-rate periodic waveform operates to control the rapid switching between portions of the outputted antenna element signals to emulate unidirectional movement by a virtual, interpolated receiver antenna element along a locus parallel to the line of transmitting antennas, or at least not orthogonal to it. The emulated receiver antenna element movement produces a fractional pseudo-Doppler frequency shift that results from its passage through the characteristic phase gradient of each MIMO beam footprint.

The high-rate periodic waveform also serves to modulate and time-gate the outputted antenna signals so as to limit them to the time-intervals during which fractional pseudo-Doppler shift imparted to each of the received MIMO modes is valid and unidirectional. In so doing, the variable ratio combining unit operates to proportionally combine the modulated, time-gated antenna element output signals to form a broadband output signal at its output ports $Z_1$, $Z_2$.

At task block 1606, the combined modulated, time-gated antenna element output signals are shifted by multiples of frequency F and then low-pass filtered to generate baseband signals $X_m$. At task block 1608, the baseband signals $X_m$ are each multiplied by a weighting coefficient $C_{n,m}$ and then summed up to provide separate n-th MIMO mode baseband signals $Y_n$. And, at task block 1610, process 1600 operates to apply same baseband signal vector X to all N rows of the complex-valued weighting coefficients in order to collect all MIMO mode outputs in output vector Y.

At task block 1612, process 1600 operates to equalize and demodulate each of the N MIMO mode signals $Y_n$ and at task block 1614, recombine the N demodulated data streams.

Figure 16B:
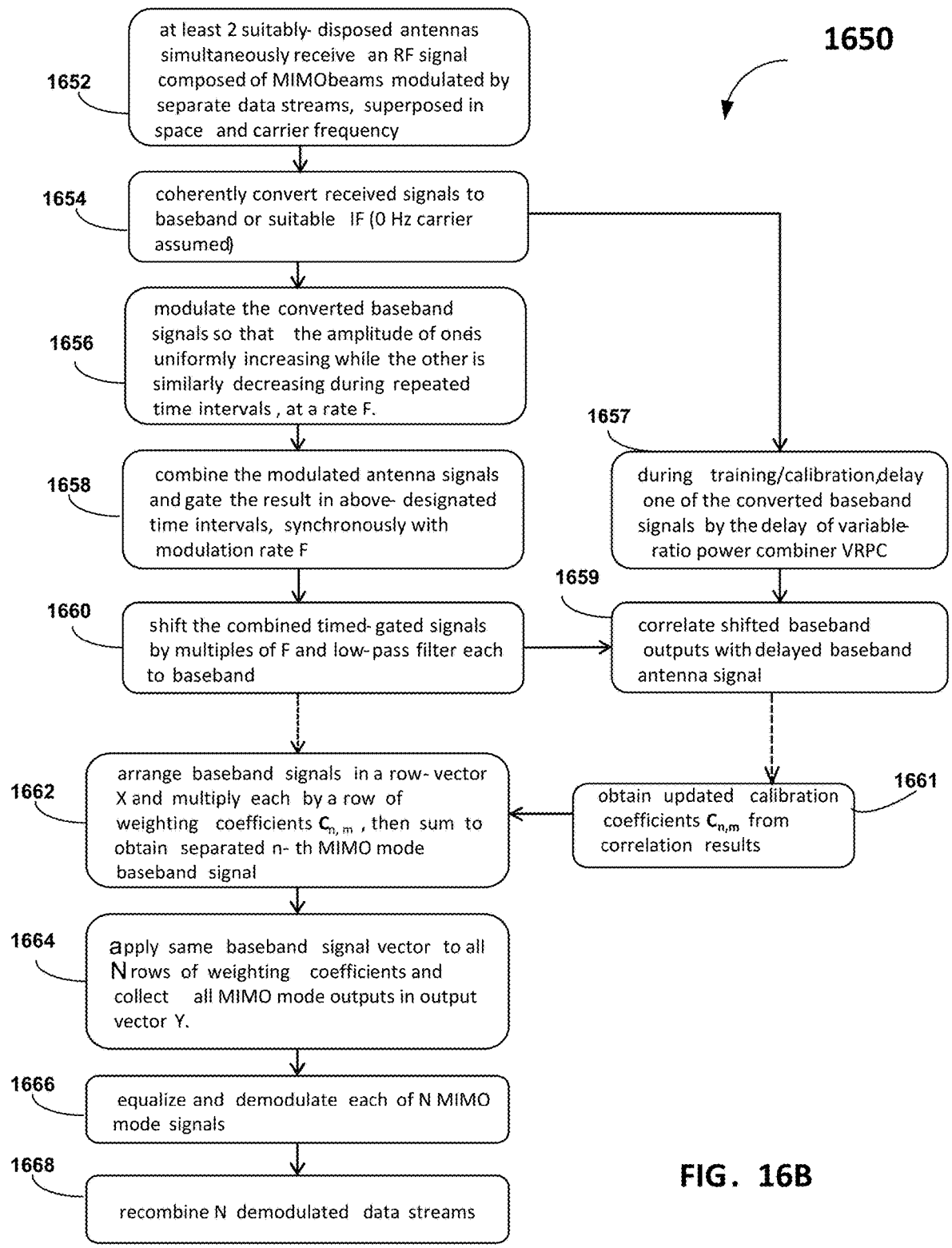
FIG. 16B depicts a comprehensive detailed functional flow diagram of the MIMO signal recovery process, in accordance with another embodiment of the present disclosure.

FIG. 16B depicts a comprehensive detailed functional flow diagram of the MIMO signal recovery process 1650, in accordance with another embodiment of the present disclosure. As shown, process 1650 begins at task block 1652, in which at least two suitably-disposed antennas simultaneously receives an RF signal composed of MIMO beams modulated by separate data streams that are superposed in space and carrier frequency. At task block 1654, the received antenna signals are coherently converted to baseband or a suitable intermediate frequency IF (a 0 Hz carrier is assumed). The converted baseband antenna signals are also simultaneously forwarded to task 1657 for operations during training or calibration modes.

At task 1656, the converted baseband antenna signals are modulated such that the amplitude of one signal is uniformly increasing while the amplitude of the other signal is commensurately decreasing during repeated time intervals at a rate F. At task 1658, the modulated antenna signals are combined and may be gated in accordance with the above-designated time intervals synchronously with modulation rate F. Then at task 1660, the combined timed-gated signals are shifted by multiples of C and then low-pass filtered to baseband.

As noted above, the converted baseband antenna signals are simultaneously forwarded to task 1657 in which, during training/calibration operations, one of the converted baseband antenna signals is delayed by the delay of a variable-ratio power combiner (VRPC). At task 1659, the VRPC-delayed baseband signal is subsequently correlated with the shifted baseband signals produced by task 1660 and, in task 1661, updated calibration coefficients $C_{n,m}$ are obtained from the correlation results, e.g. using integrators in an adaptive Least-Mean-Squares (LMS) algorithm.

At task 1662, the shifted baseband signals produced by task 1660 are arranged in a row vector X, multiplied by the updated calibration coefficients $C_{n,m}$ produced by task 1661, and then summed to obtain a separated n-th MIMO mode baseband signal, as part of an adaptive LMS algorithm. In task 1664, the same baseband signal vector operation is applied to all N rows of weighting coefficients and the N MIMO mode baseband signals are collected in output vector Y, in what effectively amounts to a matrix-coefficient version of an adaptive LMS algorithm.

At task 1666, each of the N MIMO mode baseband signals are equalized and demodulated and, at task 1668, the N MIMO mode baseband signals are recombined.

In at least one embodiment, training information and/or synchronization information may be embedded into the signal transmitted by MIMO transmitter 910. The training information may be provided periodically as part of the transmitted signal to facilitate the adaptation of the pseudo-Doppler receiver parameters and frequency-domain coefficients. In other words, the training information may be inserted into the transmitted signals to enable the MIMO receiver 920 to adjust its parameters so as to compensate for changes in the propagation environment of the MIMO link 900. In addition, other mobility-enabling features may be included into the signal transmitted by MIMO transmitter 910. For example, the transmitted signal may also include means of beamsteering or otherwise shaping of the MIMO modes.

As described above, the capacity of a MIMO link 900 with the pseudo-Doppler receiver 930 may be increased by a so-called "channelization". The channelization may be achieved by applying the same technique in parallel to each of several disjoint frequency channels in the MIMO receiver 920. The channels may be transmitted by the same transmitter antenna by a correspondingly channelized transmitter.

In some embodiments, a sine-modulated and cosine-modulated multiplying elements and a coherent summation block as depicted in FIG. 3B may be used in the pseudo-Doppler receiver signal-processing system for recovering MIMO modes, instead of the modulated VRPCs depicted in FIG. 3A. It should be understood that implementation of gating and/or modulation waveforms may vary in various embodiments.

The architecture and methods as described herein may be used in a propagation environment that changes with time. The technique as described herein may use different adaptive algorithms to adapt the frequency-domain filters. In some embodiments, Fast Robust Quasi-Newton (FRQN) algorithm, or other adaptive algorithms with faster and/or more uniform convergence properties, may be used in place of the LMS algorithm.

The use of other adaptive algorithms may be advantageous when the trade-off among the system and link parameters is such that the matrix $[U^H U]$ is ill-conditioned, as may likely happen on long links with small antenna spacings and/or long wavelengths.

Furthermore, MIMO transmitter arrays may have controllable multi-beam radiation patterns. Such multi-beam radiation patterns may be enabled, for example, either by spatial "pre-coding" of antenna weights or beamsteering algorithms. Using the MIMO arrays with the controllable multi-beam radiation patterns may allow for mobility of the pseudo-Doppler receiver of the MIMO wireless link, as the steered transmitting beams could track the mobile receiver spatially, thus maintaining the MIMO link integrity.

Similar to the OAM streams discussed above, the transmitted MIMO streams may use mutually-incoherent carriers (such as, for example, frequency-locked carriers but not necessarily phase-coherent carriers), because the phase differences among such mutually-incoherent carriers may be absorbed by the common-phase terms in the n-th mode signal, $s_n(t)e^{j\psi_{1,n}(t)}$.

Other geometries of MIMO transmitting antenna arrays may also be used with the pseudo-Doppler receiver as discussed herein. The MIMO transmitter may be a ULA antenna, or have other antenna arrangements. For example, MIMO transmitter may have two-dimensional planar arrays, steerable and multi-beam arrays, massive-MIMO and hybrid-MIMO arrays of antennas. When used with two-dimensional transmitter arrays, the receiver architecture may use at least three non-collinear antennas with at least two pseudo-Doppler receiver pairs operating on their received signals. The use of other two-dimensional transmitter antenna arrangements may allow for more MIMO degrees of freedom to enhance link capacity and/or robustness against fading.

In at least one embodiment, the pseudo-Doppler modulation waveform, the sample rate and the clock of the signal-processor (FPGA, or DSP) may be phase-coherent, derived from the same frequency source.

What is claimed is:

1. A multiple-input multiple-output (MIMO) receiver system, comprising:
    at least two receiver antenna elements configured to receive radiated MIMO signal beams and generate antenna element output signals based on the received radiated MIMO signal beams, the at least two receiver antenna elements spatially separated by a distance $d_R$;
    the radiated MIMO signal beams containing N superposed MIMO modes in which an order of each MIMO mode of the superposed MIMO modes is denoted by integer n, wherein each MIMO mode of the superposed MIMO modes encompasses an individual stream of information data symbols;

a variable ratio combining unit operative to receive and combine the antenna element output signals in time-varying proportions, the variable ratio combining unit configured to:
  switch between portions of the antenna element output signals in accordance with a high-rate periodic waveform of frequency F, the high-rate switch operation providing emulation of unidirectional movement by a virtual receiver antenna element along a locus that intersects phase-fronts of the radiated MIMO signal beams to produce a pseudo-Doppler frequency shift;
  modulate and time-gate the antenna element output signals in accordance with the high-rate periodic waveform of frequency F to impart a fractional pseudo-Doppler shift to each MIMO mode of the superposed MIMO modes; and
  combine the modulated and time-gated antenna element output signals in accordance with the fractional pseudo-Doppler shift to facilitate separation of the superposed MIMO modes encompassing streams of information data symbols.

2. The MIMO receiver system of claim 1, wherein the MIMO signal beams are Orbital Angular Momentum (OAM) beams, and each MIMO mode of the superposed MIMO modes is an OAM mode.

3. The MIMO receiver system of claim 1, wherein the frequency F of the high-rate periodic waveform satisfies a relationship: $F>B\lambda L/(\pi d_T d_R)$, where B is a bandwidth of the received radiated MIMO signal beams, $d_T$ is a distance between adjacent transmitter antennas, $\lambda$ is a radio frequency (RF) carrier wavelength, and L is a distance between the at least two receiver antenna elements and a transmitter.

4. The MIMO receiver system of claim 1, wherein the variable ratio combining unit comprises oppositely-adjusted variable phase shifting elements that are modulated by the high-rate periodic waveform.

5. The MIMO receiver system of claim 1, wherein the variable ratio combining unit comprises multiplying elements that are modulated by the high-rate periodic waveform.

6. The MIMO receiver system of claim 4, wherein the variable ratio combining unit comprises a synchronous time-gating unit that is controlled by the high-rate periodic waveform.

7. The MIMO receiver system of claim 1, wherein the variable ratio combining unit comprises at least one hybrid coupling element.

8. The MIMO receiver system of claim 1, wherein the modulated, time-gated antenna element output signals are shifted by multiples of frequency F then low-pass filtered to generate baseband signals.

9. The MIMO receiver system of claim 8, wherein the baseband signals are each multiplied by a weighting coefficient and then summed up to provide separate n-th MIMO mode baseband signals.

10. The MIMO receiver system of claim 1, further comprising four antenna elements, two first-stage variable ratio combining units, and a final stage variable ratio combining unit wherein a separation of the four antenna elements corresponding to the two first stage variable ratio combining units is $2d_R$.

11. The MIMO receiver system of claim 10, wherein the two first-stage variable ratio combining units and the final stage variable ratio combining unit are modulated synchronously with a same phase by the high-rate periodic waveform.

12. A method for processing multiple-input multiple-output (MIMO) signals, comprising:
  receiving, by at least two receiver antenna elements, radiated MIMO signal beams containing N superposed MIMO modes in which an order of each MIMO mode of the superposed MIMO modes is denoted by integer n, wherein each MIMO mode of the superposed MIMO modes encompasses an individual stream of information data symbols, the at least two receiver antenna elements being spatially separated by a distance $d_R$;
  generating, by the at least two receiver antenna elements, antenna element output signals based on the received radiated MIMO signal beams;
  combining, by a variable ratio combining unit, the antenna element output signals in time-varying proportions;
  switching between portions of the antenna element output signals in accordance with a high-rate periodic waveform of frequency F, the high-rate switch operation providing emulation of unidirectional movement by the at least two receiver antenna elements along a locus intercepting phase-fronts of the transmitted MIMO beams, to produce a pseudo-Doppler frequency shift;
  modulating and time-gating the antenna element output signals in accordance with the high-rate periodic waveform of frequency F to impart a fractional pseudo-Doppler shift to each MIMO mode of the superposed MIMO modes; and
  combining the modulated and time-gated antenna element output signals in accordance with the fractional pseudo-Doppler shift to facilitate recovery of the superposed MIMO modes encompassing streams of information data symbols.

13. The method of claim 12 wherein the MIMO signal beam is an Orbital Angular Momentum (OAM) signal beam and wherein each MIMO mode is an OAM mode.

14. The method of claim 12, wherein the frequency F of the high-rate periodic waveform satisfies a relationship: $F>B\lambda L/(\pi d_T d_R)$, where B is a bandwidth of the received radiated MIMO signal beams, $d_T$ is a distance between adjacent transmitter antennas, $\lambda$ is a radio frequency (RF) carrier wavelength, and L is a distance between the at least two receiver antenna elements and a transmitter.

15. The method of claim 12, wherein the variable ratio combining unit comprises oppositely-adjusted variable phase shifting elements that are modulated by the high-rate periodic waveform.

16. The method of claim 12, wherein the variable ratio combining unit comprises multiplying elements that are modulated by the high-rate periodic waveform.

17. The method of claim 16, wherein the variable ratio combining unit comprises a synchronous time-gating unit that is controlled by the high-rate periodic waveform.

18. The method of claim 12, wherein the variable ratio combining unit comprises at least one hybrid coupling element.

19. The method of claim 12, further comprising shifting the modulated, time-gated antenna element output signals by multiples of frequency F and low-pass filtering the antenna element output signals to generate baseband signals.

20. The method of claim 19, further comprising multiplying the baseband signals by a weighting coefficient and summing up to provide separate n-th MIMO mode baseband signals.

21. The method of claim 12, further comprising providing four antenna elements, two first-stage variable ratio combining units, and a final stage variable ratio combining unit wherein the separation of the four antenna elements corresponding to the two first stage variable ratio combining units is $2d_R$.

22. The method of claim 21, further comprising modulating the two first-stage variable ratio combining units and the final stage variable ratio combining unit synchronously with a same phase by the high-rate periodic waveform.

23. The method of claim 17, wherein the method further comprises passing an output signal of the synchronous time-gating unit through a frequency-domain filter bank.

24. The method of claim 23, wherein the frequency-domain filter bank further comprises a buffer block configured to:
   store $N_{FFT}$ samples of the output signal of the synchronous time-gating unit, a number of the samples being denoted with integer $N_{FFT}$;
   generate a vector of the output signal of the synchronous time-gating unit.

25. The method of claim 24, further comprising:
   applying a time window to the vector of the output signal of the synchronous time-gating unit to generate a time window output; and
   applying a Fast-Fourier-Transform (FFT) to the time window output at an FFT block.

26. The method of claim 25, further comprising:
   shifting spectral outputs of the FFT block by modulating an output signal of the FFT block with a periodic waveform and low-pass filtering the spectral outputs to generate baseband signals; and
   further multiplying the baseband signals by weighting coefficients and summing up to provide separate n-th MIMO mode baseband signals.

27. The method of claim 26, further comprising generating adapted weighting coefficients by determining an error signal by subtracting the separate n-th MIMO mode baseband signals from a reference signal and multiplying the error signal by the spectral outputs of the FFT block.

28. The method of claim 26, wherein the periodic waveform is complex-conjugate sinusoid having a frequency that is a corresponding multiple of twice the frequency F.

* * * * *